(12) United States Patent
Inoue et al.

(10) Patent No.: US 6,934,274 B2
(45) Date of Patent: Aug. 23, 2005

(54) MOBILE IP COMMUNICATION SCHEME USING DYNAMIC ADDRESS ALLOCATION PROTOCOL

(75) Inventors: Atsushi Inoue, Kanagawa (JP); Masahiro Ishiyama, Tokyo (JP); Atsushi Fukumoto, Kanagawa (JP); Yoshiyuki Tsuda, Kanagawa (JP); Toshio Okamoto, Tokyo (JP); Masataka Goto, Kanagawa (JP); Yoshinari Kumaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 125 days.

(21) Appl. No.: 10/184,930

(22) Filed: Jul. 1, 2002

(65) Prior Publication Data

US 2002/0167922 A1 Nov. 14, 2002

Related U.S. Application Data

(63) Continuation of application No. 09/253,128, filed on Feb. 19, 1999, now Pat. No. 6,510,153.

(30) Foreign Application Priority Data

Feb. 20, 1998 (JP) ............................................ 10-039138
Mar. 25, 1998 (JP) ............................................ 10-077549

(51) Int. Cl.$^7$ .......................... H04Q 7/24; H04L 12/66; H04L 12/28
(52) U.S. Cl. ........................ 370/338; 370/356; 370/410
(58) Field of Search ................................ 455/432, 427, 455/428, 430, 433, 435; 370/338, 331, 352, 354, 313, 329, 392, 389; 709/245, 224, 201, 202, 203

(56) References Cited

U.S. PATENT DOCUMENTS 5,572,528 A * 11/1996 Shuen ........................ 370/402
5,708,655 A    1/1998 Toth et al.
5,745,699 A *  4/1998 Lynn et al. .................. 709/245

(Continued)

OTHER PUBLICATIONS

Perkins et al., "Using DHCP with Computers That Move," Wireless Networks (Oct. 1995) 1(3):341–353, J.C. Baltzer AG, Science Publishers, Amsterdam, NL.

(Continued)

*Primary Examiner*—Hanh Nguyen
(74) *Attorney, Agent, or Firm*—Foley & Lardner LLP

(57) ABSTRACT

A mobile IP communication scheme in which the mobile computer can be operated using the mobile communication protocol such as Mobile IP even in the case where the home network is operated by the dynamic address allocation protocol such as DHCP is disclosed. The current location registration message to be transmitted by the mobile computer from the visited site to the mobile computer management device contains an information indicating that the dynamic address allocation has been received at the home network and an information capable of identifying the mobile computer, and the mobile computer management device carries out exchanges with the dynamic address management server on behalf of the mobile computer, so that the mobile computer which has received the dynamic address allocation at the home network can be operated at the visited site by using the mobile communication protocol.

9 Claims, 16 Drawing Sheets

U.S. PATENT DOCUMENTS

| | | | |
|---|---|---|---|
| 5,812,819 A | * | 9/1998 | Rodwin et al. ............... 703/23 |
| 5,862,345 A | | 1/1999 | Okanoue et al. |
| 5,991,287 A | | 11/1999 | Diepstraten et al. |
| 6,181,931 B1 | | 1/2001 | Alldredge |
| 6,510,153 B1 | * | 1/2003 | Inoue et al. ................ 370/354 |
| 6,535,493 B1 | * | 3/2003 | Lee et al. ................... 370/329 |
| 6,578,088 B2 | * | 6/2003 | Ohno et al. ................ 709/245 |
| 6,608,832 B2 | | 8/2003 | Forslow |

OTHER PUBLICATIONS

Perkins et al., "DHCP for Mobile Networking with TCP/IP," Proceedings IEEE Symposium on Computers and Communications Jun. 27–29, 1995, pp. 255–261; Alexandria, Egypt.

C. Perkins, Editor, IP Mobility Support, IEFE RFC 2002, Oct. 1996, pp. 1–78.

* cited by examiner

FIG.11

| MOBILE COMPUTER IDENTIFIER | DHCP ADDRESS | DHCP SERVER ADDRESS | LEASE TIME | DATALINK LAYER ADDRESS | OTHER INFORMATION |
|---|---|---|---|---|---|
| ... | | | | | |

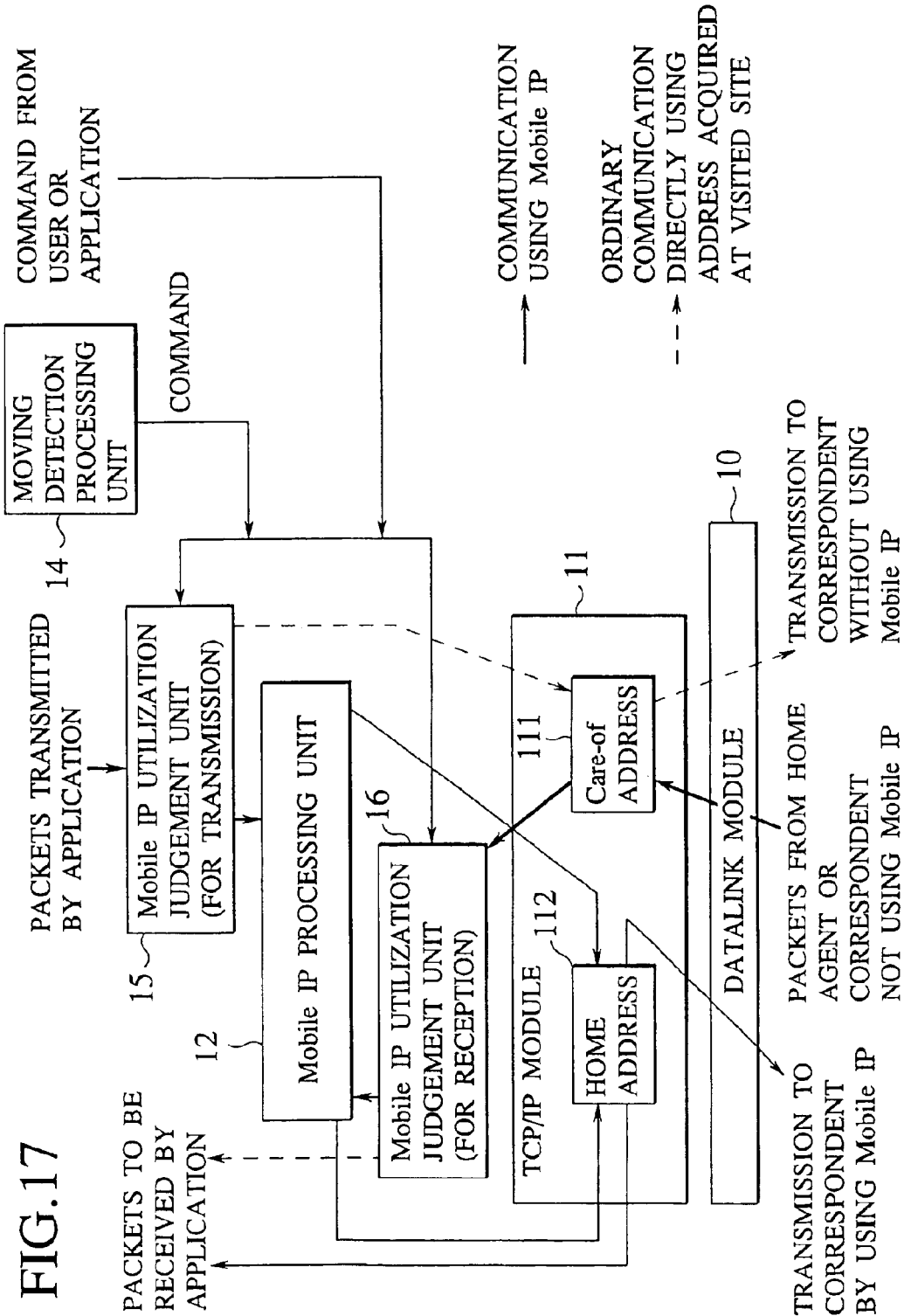

MOBILE IP COMMUNICATION SCHEME USING DYNAMIC ADDRESS ALLOCATION PROTOCOL

This application is a continuation of application Ser. No. 09/253,128 filed Feb. 19, 1999 now U.S. Pat. No. 6,510,153.

BACKGROUND OF THE INVENTION

1. Field of the Invention

The present invention relates to a mobile computer device capable of carrying out communications while moving among a plurality of inter-connected networks, and a mobile computer management device for managing a moving location information of the mobile computer and transferring packets destined to the mobile computer to a current location of the mobile computer, as well as a mobile computer management method and a communication control method suitable for these devices.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called "Internet" has become very popular, and there are new computer businesses for connecting to the Internet and utilizing open information and services, or for providing information and services to external users who make accesses through the Internet. In addition, new technology is developed in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

In general, in a case of realizing the mobile computing, a router (home agent) for managing the visiting site information of the mobile computer is provided at a network (home network) to which the mobile computer belongs, and when the mobile computer is away from the home network, the mobile computer sends a registration message for indicating a current location to this home agent. When this registration message is received, the transmission of data destined to the mobile computer is realized by capturing it by the home agent of the mobile computer, and carrying out the data routing control with respect to the mobile computer by encapsulating an IP packet destined to an original address of the mobile computer within a packet destined to a current location address of the mobile computer.

For example, in FIG. 1, this role is played by a home agent (HA) 5 in a case where the mobile computer 2 that originally belongs to the home network 1a moves to another network 1b and carries out the communication with another computer (correspondent host: CH) 3 within the other network 1c. This is a scheme called Mobile IP which is currently in a process of being standardized by the mobile-IP working group of the IETF which is the standardizing organization for the Internet (see, IETF RFC 2002, IP mobility support (C. Perkins)).

Now, in the Mobile IP scheme, the mobile transparency of the mobile computer on the IP networks is supported by continually using a fixed address assigned at a network (home network) to which the mobile computer originally belongs even at visited sites. This address will be referred to as a home address. When the mobile computer moves to a new visited site, the mobile computer sends a current location registration message as shown in FIG. 2 to the home agent, according to the specification of RFC 2002. In FIG. 2, "Home Address" is the home address of the mobile computer, "Care-of Address" is a temporal address for receiving packets transferred from the home agent at the visited site network, which is to be used as a destination address to be attached to an outer header of (encapsulated) data to be transferred from the home agent.

Namely, in order to carry out communications according to the Mobile IP of RFC 2002, two addresses of (1) a fixed home address of the home network, and (2) a Care-of address allocated at the visited site network, are necessary.

On the other hand, as far as the address management scheme at the home network is concerned, it was common to allocate addresses fixedly to PCs or workstations provided at the home network, but due to the spread of portable PCs and also in order to simplify the address management, it is now rather normal to allocate addresses dynamically to hosts using a method called DHCP (Dynamic Host Configuration Protocol) (see RFC 1541 and 2131).

In the DHCP, IP addresses are dynamically allocated by a DHCP server in response to a request from each host, from a certain address region that is reserved in advance.

If the home site of the mobile computer which moves while using the Mobile IP is operated by this DHCP, there is no guarantee for being capable of acquiring a specific IP address again when the mobile computer is re-connected at the visited site or the mobile computer moves to another subnet. Also, there can be cases where, after the mobile computer moves, another host uses an IP address that has been used by the mobile computer up until then, so that it is difficult to use the address allocated by the DHCP as a home address of the Mobile IP according to the conventional specification of RFC 2002 alone.

Thus in the conventional Mobile IP scheme, if the home network of the mobile computer is operated by the dynamic address allocation such as DHCP, there is a difficulty when the mobile computer tries to re-connect after moving to the visited site, in that there is no guarantee for continually using an address that has been allocated at the home site up until then. In particular, in the case of carrying out home address dependent communication processing at the visited site, such communications become impossible when the home address is changed.

SUMMARY OF THE INVENTION

It is therefore an object of the present invention to provide a mobile IP communication scheme in which the mobile computer can be operated using the mobile communication protocol such as Mobile IP even in the case where the home network is operated by the dynamic address allocation protocol such as DHCP.

According to one aspect of the present invention there is provided a mobile computer management device for managing a moving location information of a mobile computer which is capable of carrying out communications while moving among inter-connected networks, and transferring packets destined to the mobile computer to a current location of the mobile computer, the mobile computer management device comprising: a reception unit for receiving a location registration message containing a first information on the current location of the mobile computer, a second information indicating that the mobile computer has received a dynamic address allocation at a home network, and a third information capable of identifying the mobile computer, from the mobile computer at a visited site outside the home network; a transmission unit for transmitting a request message for requesting a re-allocation of a dynamic address indicated by the third information contained in the location registration message received by the reception unit, to an address management server of the home network; and a response unit for generating a registration response message reflecting a response to the request message from the address management server, and returning the registration response message to the mobile computer.

According to another aspect of the present invention there is provided a mobile computer management device for managing a moving location information of a mobile computer which is capable of carrying out communications while moving among inter-connected networks, and transferring packets destined to the mobile computer to a current location of the mobile computer, the mobile computer management device comprising: a proxy processing unit for receiving a prescribed message from the mobile computer, and transmitting a request message for requesting not to allocate a dynamic address allocated to the mobile computer at the home network to another computer for a prescribed period of time to an address management server of the home network; a reception unit for receiving a location registration message containing information on the current location of the mobile computer and information capable of identifying the mobile computer, from the mobile computer at a visited site outside the home network; and a response unit for returning a response message to the mobile computer in response to the location registration message such that the mobile computer can carry out mobile communications using the dynamic address allocated to the mobile computer at the home network.

According to another aspect of the present invention there is provided a mobile computer device capable of carrying out communications while moving among inter-connected networks, the mobile computer device comprising: a transmission unit for transmitting a location registration message containing a first information on a current location of the mobile computer device, a second information indicating that the mobile computer device has received a dynamic address allocation at a home network, and a third information capable of identifying the mobile computer device, from a visited site outside the home network to a mobile computer management device provided at the home network for transferring packets destined to the mobile computer device to the current location of the mobile computer device; and a mobile communication setting unit for receiving a response message returned from the mobile computer management device which carried out a dynamic address re-allocation processing in response to the location registration message, and making a setting for mobile communications according to a response code contained in the response message.

According to another aspect of the present invention there is provided a mobile computer device capable of carrying out communications while moving among inter-connected networks which includes a mobile computer management device provided at a home network of the mobile computer device for transferring packets destined to the mobile computer device to a current location of the mobile computer device, the mobile computer device comprising: a transmission unit for transmitting a message for requesting not to allocate a dynamic address allocated to the mobile computer device at the home network to another computer for a prescribed period of time, to an address management server of the home network or the mobile computer management device; and a mobile communication unit for exchanging messages with the mobile computer management device and carrying out mobile communications using the dynamic address allocated to the mobile computer device at the home network, after the mobile computer device moved outside the home network.

According to another aspect of the present invention there is provided a mobile computer device capable of carrying out communications while moving among inter-connected networks, the mobile computer device comprising: a judging unit for judging a type of communications to be carried out as either mobile communications from a visited site outside a home network through a mobile computer management device provided at the home network for transferring packets destined to the mobile computer device to a current location of the mobile computer device, or direct communications with a correspondent; and a packet transmission unit for transmitting transmission packets by entering a dynamic address allocated to the mobile computer device at the home network into a source address of the transmission packets when the judging unit judges that the mobile communications are to be carried out, or by entering a dynamic address allocated to the mobile computer device at the visited site network into a source address of the transmission packets when the judging unit judges that the direct communications are to be carried out.

Note also that each aspect of the present invention described herein as a feature of a mobile computer management device or a mobile computer device can be also conceived as a feature of a mobile computer management method or a communication control method, or as a feature of an article of manufacture storing programs for causing the computer to function as the mobile computer management device or the mobile computer device.

Other features and advantages of the present invention will become apparent from the following description taken in conjunction with the accompanying drawings.

BRIEF DESCRIPTION OF THE DRAWINGS

FIG. 11 is a diagram showing an exemplary configuration of a mobile computer information management table according to one embodiment of the present invention.

FIG. 17 is a block diagram showing another exemplary configuration of a mobile computer according to one embodiment of the present invention.

DETAILED DESCRIPTION OF THE PREFERRED EMBODIMENTS

Referring now to FIG. 1 to FIG. 17, one embodiment of a mobile IP communication scheme according to the present invention will be described in detail.

Figure 1:
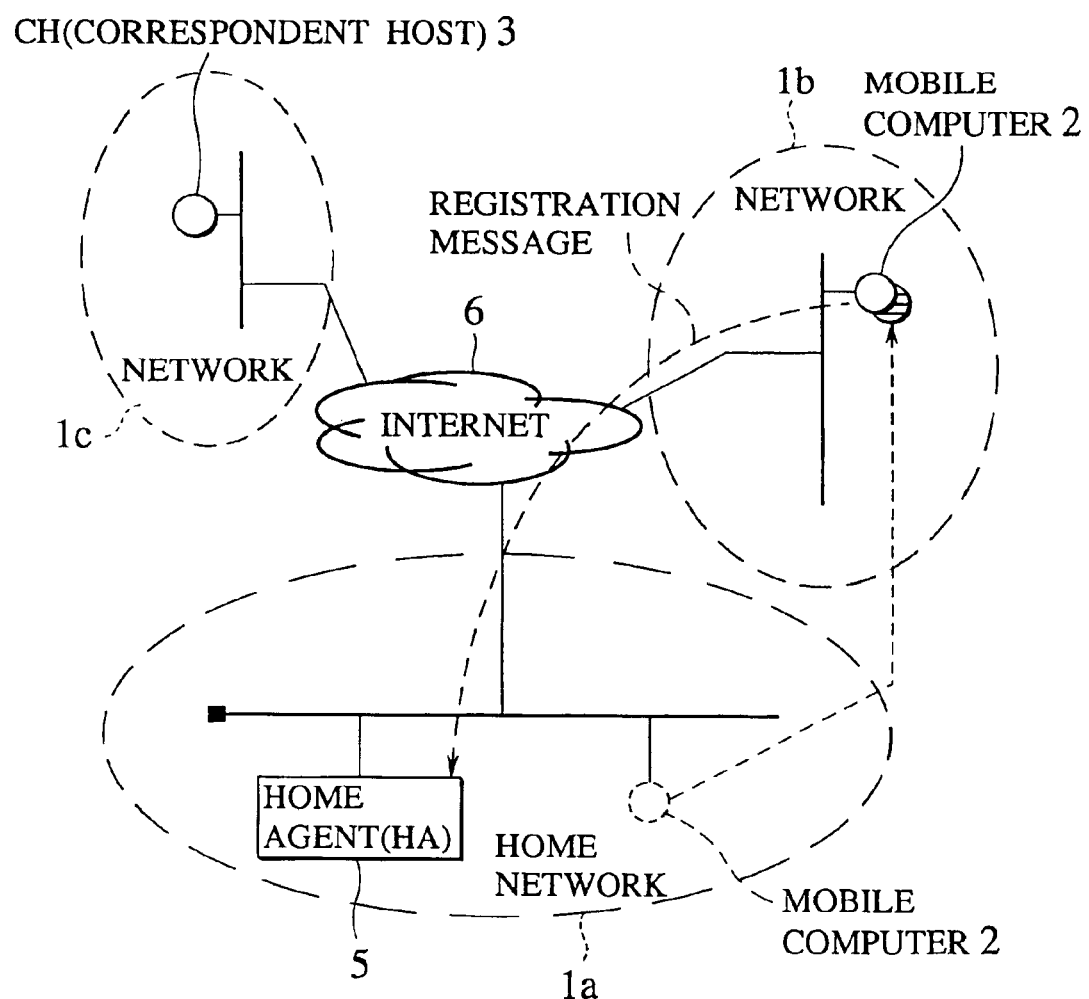
FIG. 1 is a schematic diagram showing an exemplary basic configuration of a communication system according to one embodiment of the present invention.

FIG. 1 shows an exemplary basic configuration of a communication system according to the first embodiment. This communication system of FIG. 1 is assumed to be supporting communications of a mobile computer according to the Mobile IP. Note that the Mobile IP protocol specified by RFC 2002 has two modes including a mode that assumes an existence of a router called foreign agent (FA) for carrying out a packet delivery with respect to the mobile computer at a visited site network and a Co-located Care-of address mode in which no foreign agent is provided (the mobile computer itself plays the role of a foreign agent), and the following description will be given for an exemplary case of adopting the latter mode.

In FIG. 1, a home network 1a, a first other section network 1b and a second other section network 1c are inter-connected through the Internet 6, while a mobile computer (MN) 2 and its correspondent host (CH) 3 are connected within these networks, or connected to the Internet 6 as external nodes.

In this embodiment, the case where the mobile computer 2 having its home position within the network 1a has moved to the other section network 1b will be described.

The home network 1a is provided with a home agent (HA) 5 for managing an information on a current location at the visited site of the mobile computer in order to support the Mobile IP. Here, the number of mobile computers to be managed by one home agent is arbitrary. As described above, a transferred IP packet destined to the mobile computer 2 on move is captured by the home agent 5 at the home network, where the routing control for data with respect to the mobile computer 2 can be realized by encapsulating an IP packet destined to an original address (an address in the home network 1a) of the mobile computer 2 within a packet in the Mobile IP format which is destined to the current location address.

When the mobile computer 2 moves outside its own home network, the mobile computer 2 acquires a Care-of address to be used at a visited site network using a protocol such as DHCP or PPP (Point-to-Point Protocol) at the visited site network (1b in this example). When the Care-of address is acquired, the mobile computer 2 transmits a registration message containing a current location information to the home agent 5 in the home network 1a.

Figure 2:
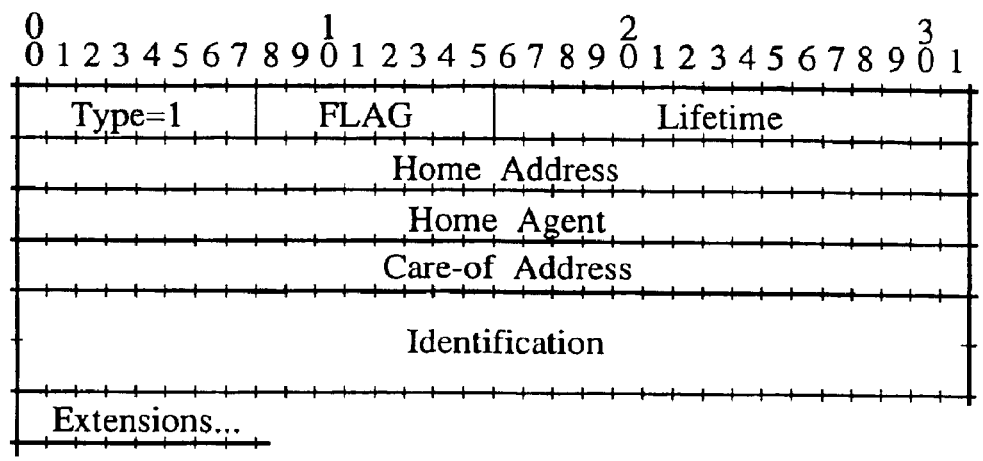
FIG. 2 is a diagram showing one exemplary format of a registration message according to one embodiment of the present invention.

FIG. 2 shows an exemplary format of the registration message to be transmitted from the mobile computer 2 to the home agent 5 as specified by RFC 2002, which includes the following fields.

"FLAG" indicates an operation mode (such as an encapsulation method) of the Mobile IP.

"Lifetime" indicates a valid period of this registration, When the valid period is over, the mobile computer 2 must carry out the re-registration by transmitting the registration message to the home agent 5 again.

"Home Address" indicates a home location of the mobile computer (which is a dynamic address in this embodiment), "Care-of Address" indicates a current location of the mobile computer 2 (which is an address acquired at a visited site in this embodiment), and "Home Agent" indicates an address of the home agent 5. Note that, as described in detail below, it is also possible to describe an information capable of identifying the mobile computer or its home address (such as a mobile computer identifier, for example) instead of the home address in the "Home Address" field.

"Identification" indicates an ID given to the registration, which is added in order to prevent a replay attack.

"Extensions" contains at least an authentication information used between the mobile computer 2 and the home agent 5.

Figure 3:
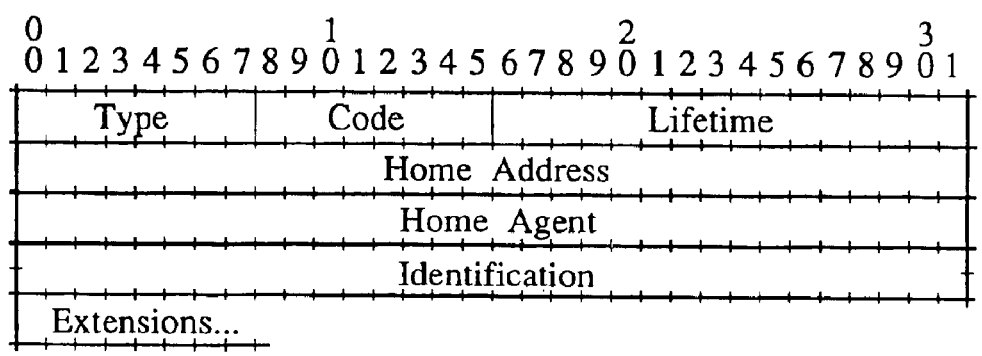
FIG. 3 is a diagram showing one exemplary format of a registration response message according to one embodiment of the present invention.

When this registration message is received by the home agent 5 and the registration processing is properly carried out, a registration reply message as shown in FIG. 3 is returned to the mobile computer 2, where "Code" describes a reply code 0 or 1 indicating the registration success. On the other hand, when the registration fails, the registration reply message in the same format as that of FIG. 3 is returned to the mobile computer 2, where reply codes indicating various reasons for the registration failure are described.

In the following, the exemplary list of reply codes that can be used here will be illustrated, where the number on a left side of a colon is a code and the description on a right side of a colon is the content indicated by the code on the left side.

<Case of Success>

0: registration accepted

1: registration accepted, but simultaneous mobility bindings unsupported

<Case of Failure for Foreign Agent>
64: reason unspecified
65: administratively prohibited
66: insufficient resources
67: mobile node failed authentication
68: home agent failed authentication
69: requested Lifetime too long
70: poorly formed Request
71: poorly formed Reply
72: requested encapsulation unavailable
73: requested Van Jacobson compression unavailable
80: home network unreachable (ICMP error received)
81: home agent host unreachable (ICMP error received)
82: home agent port unreachable (ICMP error received)
88: home agent unreachable (ICMP error received)
<Case of Failure for Home Agent>
128: reason unspecified
129: administratively prohibited
130: insufficient resources
131: mobile node failed authentication
132: foreign agent failed authentication
133: registration Identification mismatch
134: poorly formed Request
135: too many simultaneous mobility bindings
136: unknown home agent address)

Now, the exemplary case of applying the mobile IP communication scheme of the present invention to a communication system in which the home network to which the mobile computer 2 belongs is managed by the dynamic IP address allocation will be described. Here, the mobile computer of the present invention receives the dynamic IP address allocation according to the DHCP, but the other computers or mobile computers may receive the IP address allocation according to the other schemes. Also, the following description is directed to a case of allocating IP addresses according to the DHCP as specified by RFC 1541 and 2131, but the present invention is equally applicable to any dynamic address allocation scheme other than the DHCP.

Figure 4:
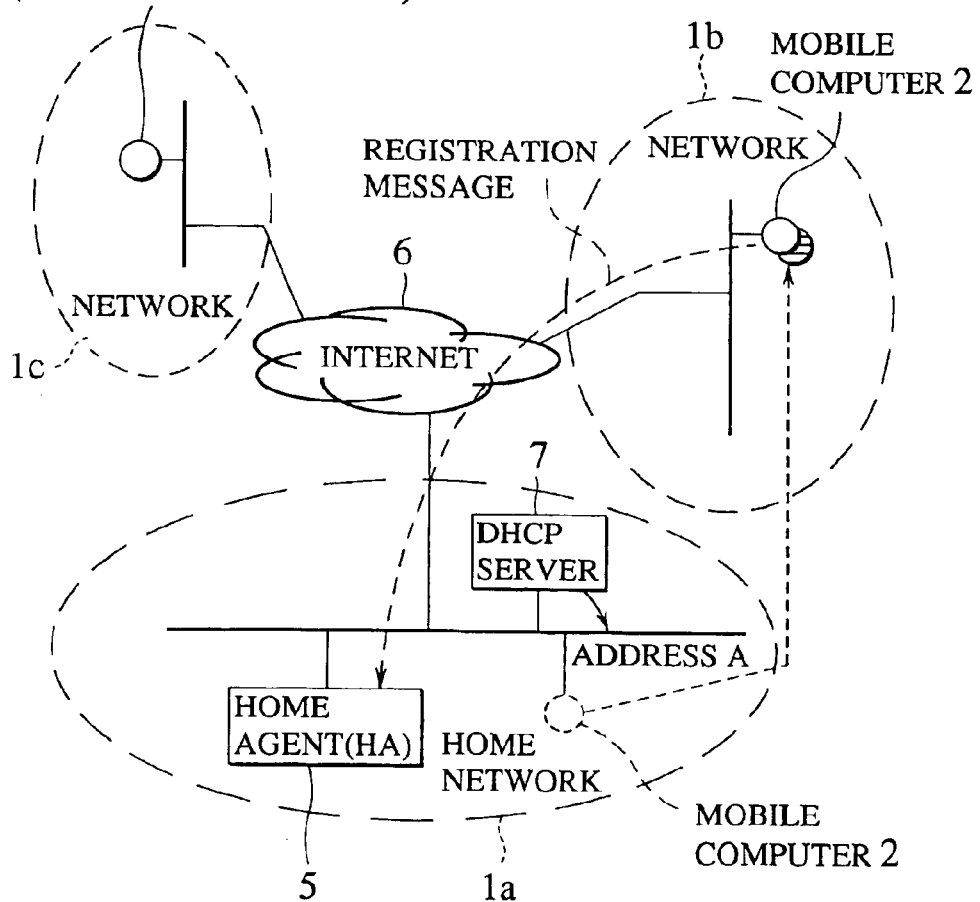
FIG. 4 is a schematic diagram showing one exemplary configuration of a communication system according to one embodiment of the present invention.

FIG. 4 shows an exemplary configuration of a communication system in the case where the home network to which the mobile computer 2 belongs carries out the dynamic IP address allocation according to the DHCP.

As shown in FIG. 4, a DHCP server 7 is provided at the home network 1a of the mobile computer 2, where the DHCP server 7 leases an IP address from a prescribed IP address range, in response to an address request from each client.

Here, it is assumed that an address A is allocated to the mobile computer 2 by the DHCP server 7 before moving. Namely, a communication module of the mobile computer 2 is set up by assigning the IP address A.

Here, the basic processing regarding the mobile IP communications by the mobile computer 2 and the home agent 5 according to this embodiment will be described.

The mobile computer 2 carries out a processing for requesting a reservation of a DHCP address (address A in this example) which is a dynamic address, to a DHCP server or a home agent 5 prior to moving (there is also an implementation which does not carry out this processing). Note that, as will be described in detail below, some mobile computer 2 requests a reservation of some dynamic address in this embodiment, and it is assumed that there can be cases where this dynamic address is allocated to another computer before this mobile computer 2 is connected to a visited site network and the registration processing of the Mobile IP is successfully completed.

When the mobile computer 2 moves to the other section network (referred to as 1b in the following example), the mobile computer 2 carries out the moving detection processing and the Care-of Address acquisition processing (either one of which is executed first depending on the implementation) as well as the Mobile IP registration processing or the Mobile IP re-registration processing. In the Mobile IP registration processing, a processing for dealing with a case where the DHCP address allocated to this mobile computer 2 before the moving is now allocated to another computer during the moving is also carried out.

Note that the exemplary configuration of the mobile computer 2 will be described later on in conjunction with the detailed description of the operation (see FIG. 6, FIG. 7, FIG. 14 and FIG. 17).

Figure 5:
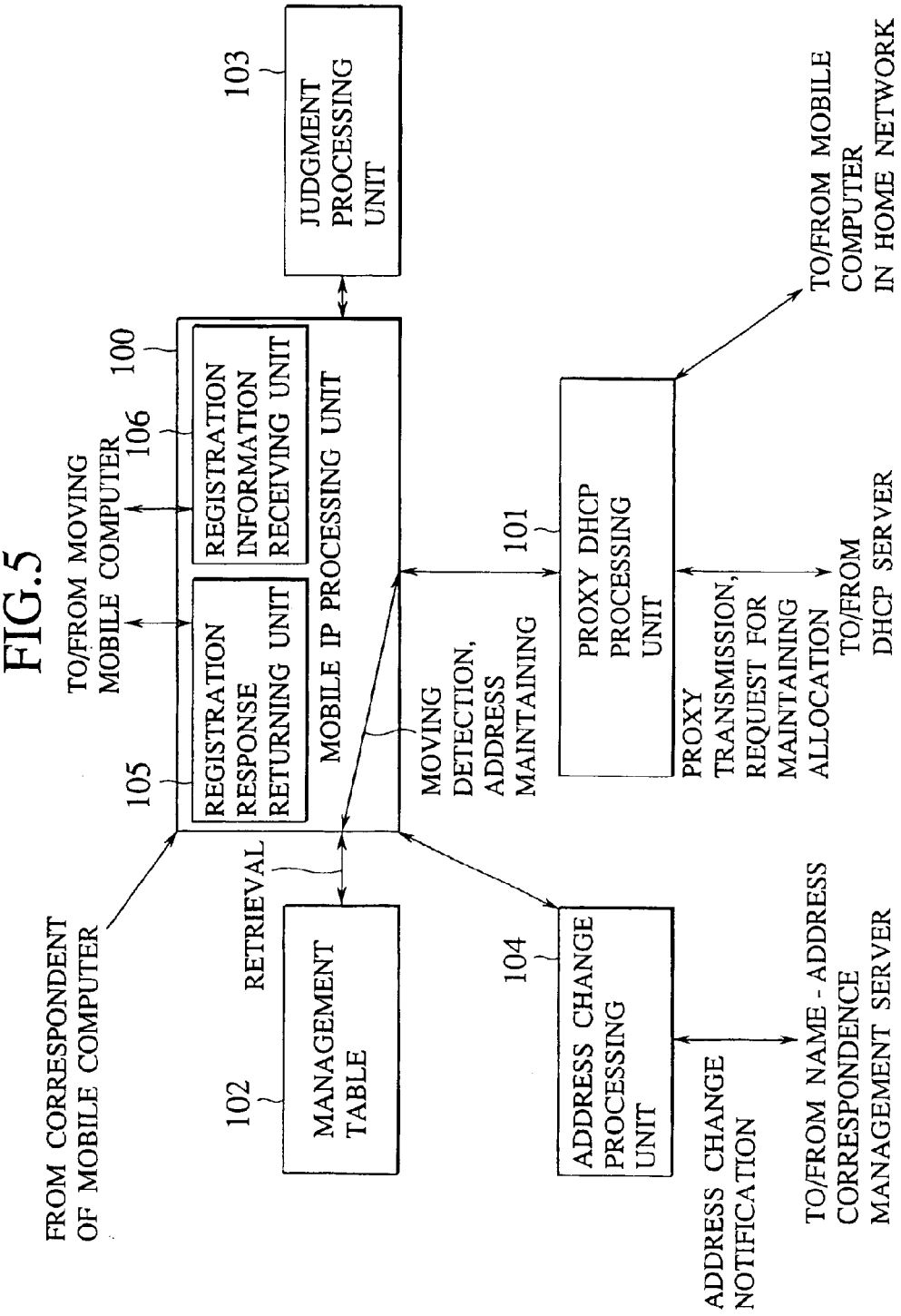
FIG. 5 is a block diagram showing an exemplary configuration of a home agent according to one embodiment of the present invention.

FIG. 5 shows an exemplary configuration of a main portion of the home agent 5. The home agent 5 has a Mobile IP processing unit 100 and a proxy DHCP processing unit 101. The Mobile IP processing unit 100 includes a registration response returning unit 105 and a registration information receiving unit 106. A management table 102, a judgement processing unit 103 and an address change processing unit 104 can be provided (or not provided) according to the need either separately or in arbitrary combination. Details of these constituent elements of the home agent 5 will be described later on.

The home agent 5 basically carries out a prescribed processing upon receiving a request from the mobile computer 2.

When the DHCP address reservation is requested from the mobile computer 2, a processing for reserving (or trying to reserve) the requested DHCP address is carried out (there is also an implementation which is not provided with this function).

When the Mobile IP registration message is received from the mobile computer 2 having a dynamic address, in addition to the usual Mobile IP registration processing for a mobile computer having a fixed address, a processing for re-allocating the DHCP address (home address) which is a dynamic address currently held by that mobile computer 2 or a processing for dealing with a case where this DHCP address is already allocated to another computer is carried out.

When the Mobile IP re-registration message is received from the mobile computer 2, in addition to the usual Mobile IP re-registration processing for a mobile computer having a fixed address, a processing to continue reserving the allocation of the DHCP address (home address) which is a dynamic address currently held by that mobile computer 2 is carried out, at least while the re-registration message is received without exceeding the valid period of the Mobile IP (there is also an implementation in which this processing to continue reserving is finished at a time of receiving an initial registration message).

In the following, the further details of this embodiment will be described.

First, a processing for reserving a dynamic address which takes place before the moving of the mobile computer 2 will be described.

Since the mobile computer 2 has received the dynamic address allocation, there is a possibility for the DHCP address used by the mobile computer 2 before the moving to get allocated to another computer while the mobile computer 2 is moving over networks. Consequently, in order to operate the mobile computer properly in the case where the mobile computer moves while carrying out connection-oriented communications such as TCP or the case of assuming the use of a service such as interactive software that presupposes the use of a fixed address and takes a procedure involving a reply to a call from a third person, it is preferable to have a higher probability for being able to maintain the dynamic address allocated to the mobile computer for carrying out the Mobile IP communications unchanged, by accounting for the conformity with the utility of the dynamic address allocation mechanism.

For this reason, in this embodiment, in the case where the mobile computer 2 moves to the other section network by leaving the home network 1a (especially when the mobile computer 2 tries to carry out communications based on the Mobile IP at the other section network at the visited site), prior to that moving, a processing for preventing (or increasing a probability of being able to prevent) the allocation of the DHCP address leased from the DHCP server 7 to the mobile computer 2, to another computer during the moving, is carried out.

Some examples of the processing for this purpose will now be described.

Figure 8:
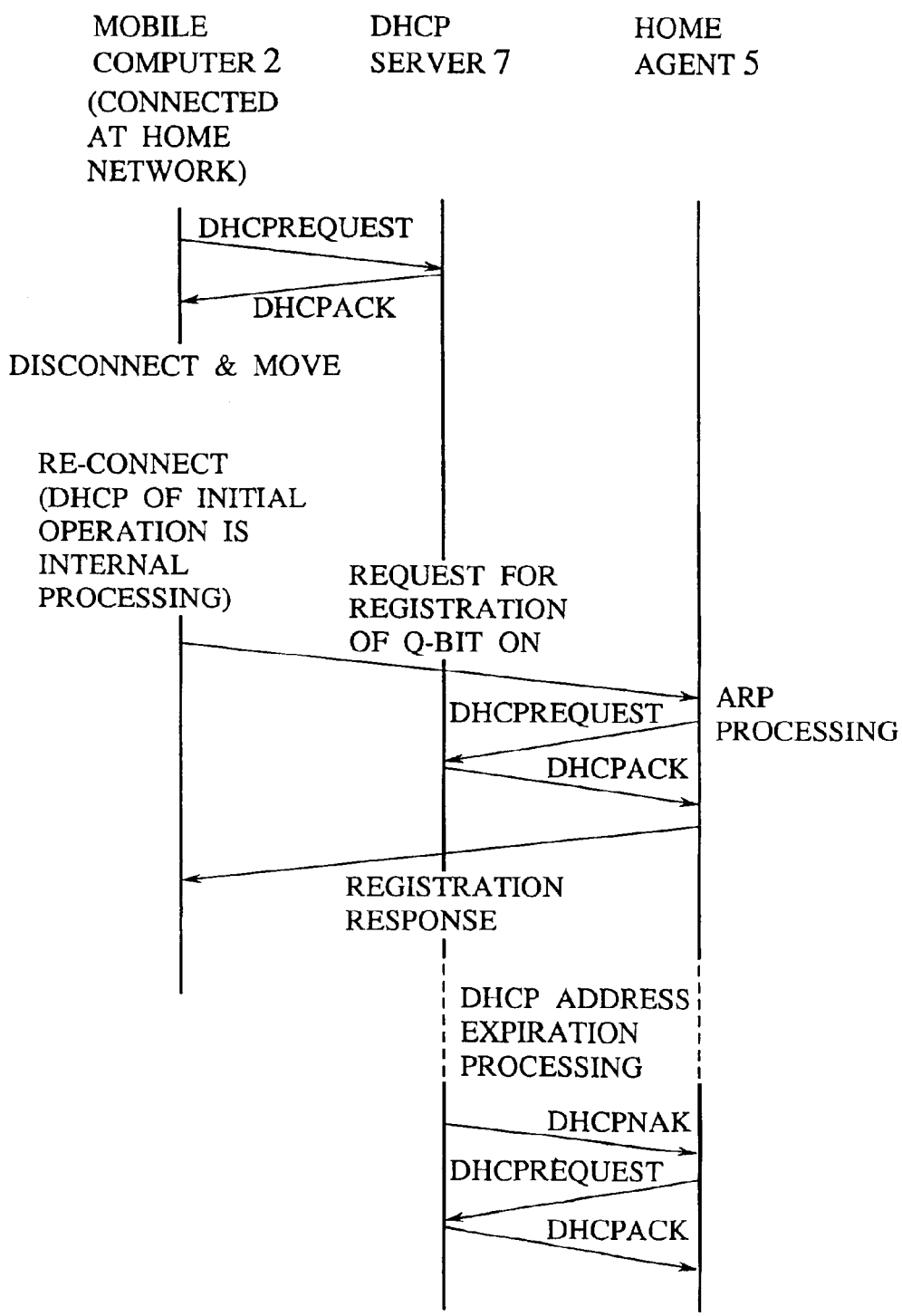
FIG. 8 is a sequence chart showing one exemplary system operation sequence according to one embodiment of the present invention.

(1) In the first example, in the case where the mobile computer 2 leaves the home network 1a and moves, before the moving, the mobile computer 2 itself transmits a prescribed message for requesting the DHCP server 7 not to allocate a specified dynamic address (address A in this example) to another computer for a prescribed period of time (see FIG. 8).

Figure 9:
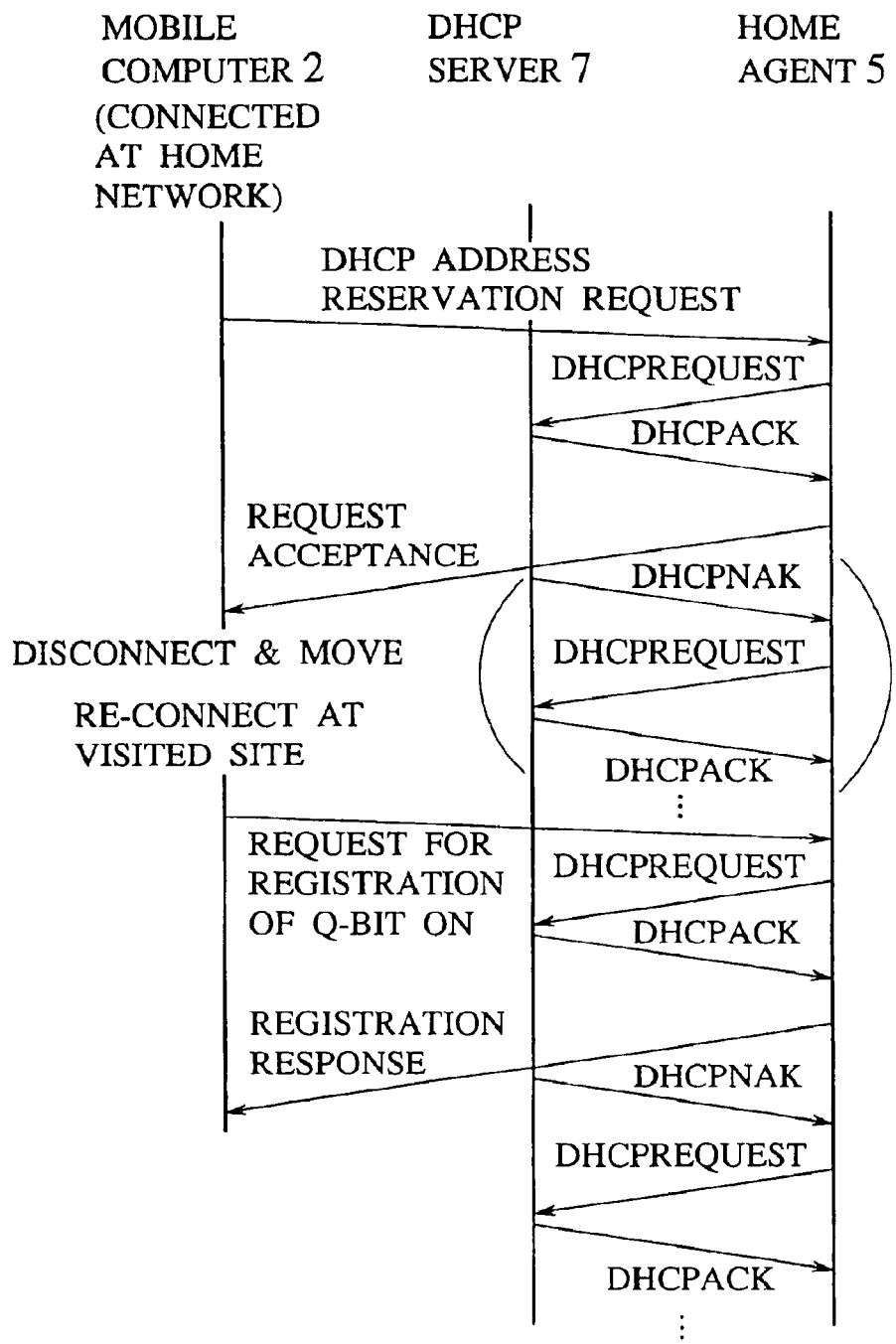
FIG. 9 is a sequence chart showing another exemplary system operation sequence according to one embodiment of the present invention.

(2) In the second example, the mobile computer 2 transmits a prescribed message (referred to as a DHCP reservation request message) for requesting the home agent 5 to carry out a processing for preventing the allocation of the dynamic address allocated to the mobile computer 2 to another computer, and upon receiving this message, the home agent 5 (the proxy DHCP processing unit 101 of FIG. 5) transmits a prescribed message for requesting the DHCP server 7 not to allocate a specified dynamic address to another computer for a prescribed period of time, on behalf of the mobile computer 2 (see FIG. 9).

In the above described (1) and (2), the prescribed message to be transmitted to the DHCP server 7 can be realized by setting appropriate lease time (which is set to be longer than usual) in a DHCPREQUEST message of the DHCP.

Note that, in this case, in the above described (2), either (a) a provision in which, if a DHCPACK message is returned from the DHCP server 7 to the home agent 5, the request acceptance message is returned from the home agent 5 to the mobile computer 2, and the mobile computer 2 moves after receiving the request acceptance message from the home agent 5, or (b) a provision in which the home agent immediately returns the request acceptance message to the mobile computer 2 upon receiving the DHCP reservation request message from the mobile computer 2 and carries out exchanges with the DHCP server 7 after that, and the mobile computer moves after receiving the request acceptance message from the home agent 5, can be acceptable.

Here, the lease time to be set in the DHCPREQUEST message should preferably be specified by a system manager in view of the number of addresses to be managed by the DHCP server 7 and the number of computers to be connected, for example (because it is not necessarily advantageous to reserve an address for the mobile computer for a long time when there are not many addresses available).

Note that, in the case where the manager judges that there is a room in the DHCP addresses managed by the DHCP server 7 (or in the case where there is another DHCP server or some other address allocation mechanism in the home network 1a and the manager judges that there is a room in the DHCP addresses by accounting for the addresses managed by that another DHCP server or some other address allocation mechanism), the DHCP to be allocated to the mobile computer can be made a fixed value by setting the lease time of the DHCPREQUEST message to be (a code indicating) infinite, so that even the address dependent application software can be executed on the mobile computer without any problem.

However, there are cases where the utility regarding the reusability of addresses according to the DHCP can be lowered when the infinite lease time is allowed to many mobile computers simultaneously, so that it is preferable to provide some limit regarding the use of infinite lease time. For example, in the case of the above described (2), the home agent or the DHCP server can: (a) define an upper limit on the number of addresses for which the infinite lease time can be set simultaneously and set the infinite lease time within a range not exceeding this upper limit in the above processing; (b) set the infinite lease time only to prescribed specific mobile computers; (c) set the infinite lease time only to those mobile computers which satisfy a certain condition at a time of moving (such as a condition that it is mounted with an application for which the invariable home address is required, for example); or (d) do any combination of (a) to (c) described above. In the case of the above described (1), the mobile computer itself may judge whether the own device can set the infinite lease time or not according to the criteria such as (b) or (c) described above, for example. As for those mobile computers for which the setting of the infinite lease time is not allowed, the finite lease time will be set.

(3) In the third example, the mobile computer 2 transmits a message for requesting the home agent 5 to carry out a processing for preventing the allocation of the dynamic address allocated to the mobile computer 2 to another computer, i.e., the DHCP reservation request message, to the home agent 5 before the moving, and upon receiving this message, the home agent 5 (the proxy DHCP processing unit 101 of FIG. 5) carries out a processing for reserving the dynamic address (address A in this example) of the mobile computer 2 through continual exchanges with the DHCP server 7 (after the request acceptance message is returned to the mobile computer 2). The mobile computer 2 moves after receiving the request acceptance message from the home agent 5.

As the processing for reserving the dynamic address in this case, the following can be used.

(a) An example for reserving the address allocation at a higher probability than conventionally possible:

The home agent 5 transmits the DHCPREQUEST message with the lease time set to be a time x at a prescribed interval of a time y which is approximately the same as or longer than x, for the DHCP address allocated to that mobile computer 2. For example, the DHCPREQUEST message with the lease time set to be 30 minutes is transmitted at one hour interval (in which case the lease time is made to expire intentionally). This processing is carried out until the location registration message for the Mobile IP communications is received from that mobile computer 2, for example, as long as the address can be reserved successfully. In this way, it is possible to maintain the DHCP address of the mobile computer 2 at a higher probability than conventionally possible albeit it is not 100%, by accounting for the conformity with the utility regarding the reusability of addresses according to the DHCP.

(b) An example for reserving the address allocation completely:

The home agent 5 continually transmits the DHCPREQUEST message to the DHCP server such that the lease time will not expire, for the DHCP address allocated to that mobile computer 2. For example, the DHCPREQUEST message with the lease time set to be a time x is transmitted at interval of a time y which is shorter than x. This processing is carried out until the location registration message for the Mobile IP communications is received from that mobile computer 2, for example. In this way, the allocation of the DHCP address of the mobile computer 2 can be maintained without failure.

Note however that this example is equivalent to transmitting the DHCPREQUEST message with the infinite lease time, so that it is preferable to provide some limit to the complete address reservation in manners as described above, for example.

(4) When it is known in advance that the DHCP address may be allowed to change for that mobile computer 2, the mobile computer 2 may not transmit the above described prescribed message such that the address reservation will not be carried out.

Note that the transmission of the prescribed message as described above can be carried out either automatically at a timing of an occurrence of a prescribed event within the mobile computer 2 or manually at a timing given by the user.

Note also that the techniques of various examples described above can be realized independently or in any suitable combination.

In the case of requesting the reservation of the DHCP address prior to the moving, the mobile computer 2 becomes possible to move when the prescribed message is transmitted to the DHCP server or the home agent as described above. In the case where the mobile computer 2 moves in a state of having its power turned off, the address A used up until then is stored into a DHCP (home address) memory region before the power is turned off.

It is to be noted here that it is generally preferably to carry out the transmission of the prescribed message for requesting the reservation of the DHCP address prior to the moving as described above, but it is also possible for the mobile computer to carry out this transmission of the prescribed message after the moving instead.

Next, with reference to an exemplary configuration of the mobile computer shown in FIG. 6, the moving detection processing in this embodiment will be described.

The moving detection processing is carried out by a moving detection processing unit 14. When the mobile computer 2 is connected to the visited site network and re-activated there (as well as when the mobile computer 2 is connected to the home network and re-activated there), the moving detection processing is carried out. Some exemplary methods for the moving detection processing include the following.

(1) A method of moving detection through a procedure for message communications with DHCP server:

An initialization DHCPDISCOVER message is transmitted, or a DHCPREQUEST message is transmitted in addition (at a DHCP processing unit 13 of FIG. 6), and a DHCP address offered by a DHCPOFFER message returned in response to the DHCPDISCOVER message or a DHCP address acquired from a DHCPACK message returned in response to the DHCPREQUEST message is compared with the DHCP address (address A in this example) stored in the own device as the home address, and (i) if the network addresses match, it is judged that the mobile computer 2 has not moved, or (ii) if the network addresses do not match, it is judged that the mobile computer 2 has moved.

Note that in the case where an address information (network address) of the home network of the own device is stored within the mobile computer 2 separately from the DHCP address, this address may be compared with the network address of the above described offered or acquired DHCP address.

In this method, the moving detection becomes possible when the DHCP server exists on the visited site network.

(2) A method of moving detection from address offered or acquired from an address management server other than DHCP server:

This method is basically similar to the above described (1), and an address offered or acquired from an address management server other than the DHCP server at the connected network through a prescribed procedure is compared with the DHCP address or the network address of the home network stored in the own device, and the moving is detected as described above.

(3) A method of moving detection using advertisement:

The advertisement broadcasted (multicasted) over the connected network from a router or agent (home agent, foreign agent) existing in that network is listened (received), and an address information (the network address of that network) described in that advertisement is compared with the DHCP address or the network address of the home network stored in the own device, and the moving is detected as described above.

Figure 6:
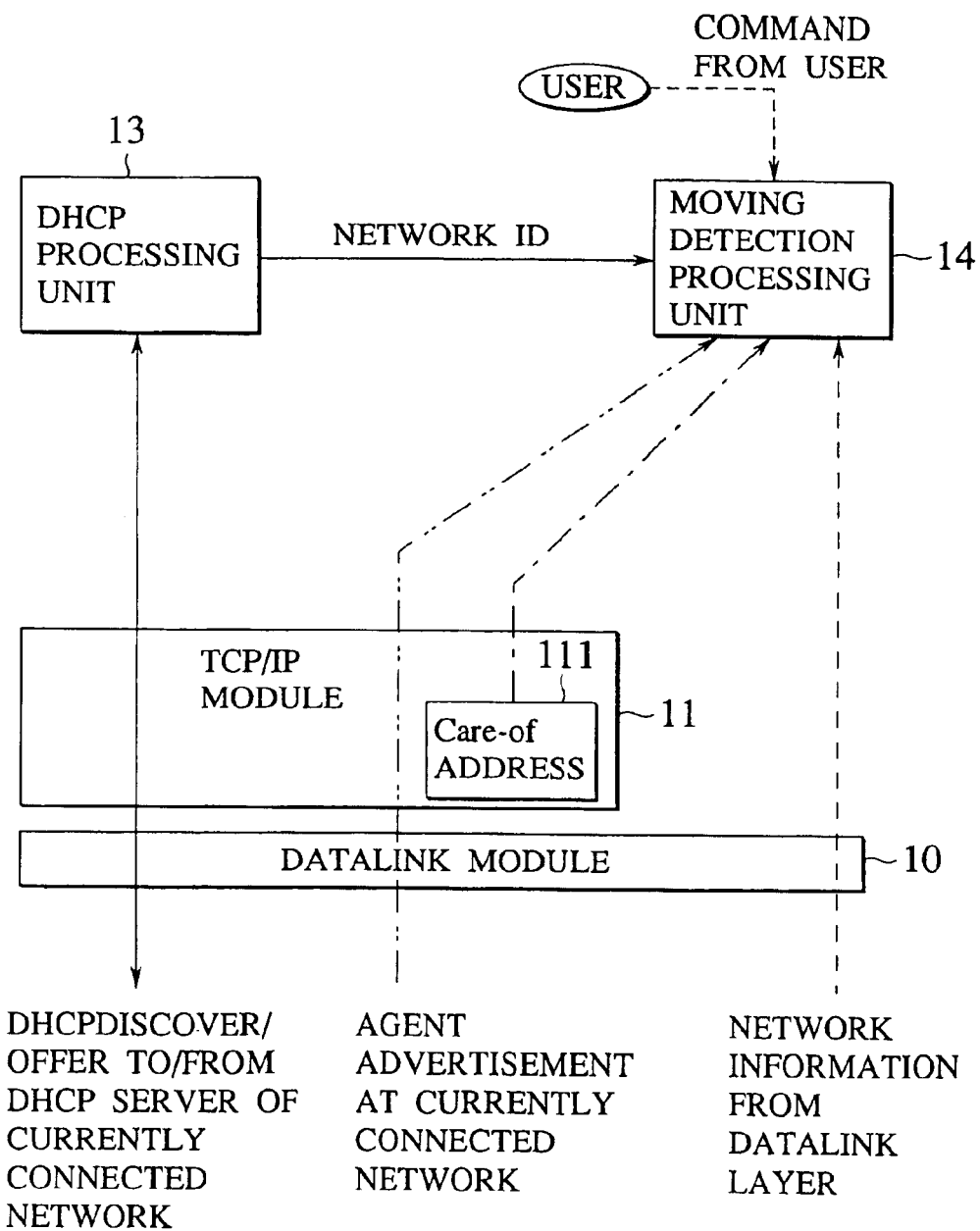
FIG. 6 is a a block diagram showing an exemplary configuration of a part of a mobile computer related to moving detection and address acquisition according to one embodiment of the present invention.

(4) A method of moving detection by referring to an address set to TCP/IP module:

An IP address (which corresponds to the Care-of Address 111 of FIG. 6 if it is acquired at the visited site network) that is set to the TCP/IP module 11 of FIG. 6 by some way (DHCP procedure, manual operation, for example) in the mobile computer is compared with the DHCP address or the network address of the home network stored in the own device, and the moving is detected as described above.

(5) A method of moving detection based on user command:

An information indicating whether the mobile computer 2 is currently connected to the home network or to the other section network after moving outside the home network is entered by the user into the mobile computer 2, and the mobile computer 2 carries out the subsequent processing according to this entered command.

(6) A method of moving detection at datalink layer:

In the above described (1) to (5) the moving is detected at the network layer, but it is also possible to detect the moving by listening to the information obtained from the datalink layer (at a datalink module 10 of FIG. 6). For this moving detection at the datalink layer, there is no need to detect the moving over IP subnets, but the moving over IP subnets can be detected by any one of the above described (1) to (5) when the moving related to a concept different from the IP subnets is detected (a situation where the moving at the datalink layer level is detected by the moving at the IP subnet level cannot be ascertained), for example.

The methods of the above described (1) to (5) can be realized separately or in any suitable combination. In the case of using combination, the order in which these methods are to be carried out can be determined in advance.

Note that the transmission of the prescribed message or the transition to a state for waiting reception of advertisement as described above can be carried out either automatically at a timing of an occurrence of a prescribed event within the mobile computer 2 or manually at a timing given by the user.

Next, the address acquisition processing at the visited site network will be described.

When the moving is detected by the procedure as described above, the processing for acquiring an address (Care-of Address) at the visited site network is carried out next (although there can be cases where the moving is detected after the address is acquired).

The acquisition of the Care-of Address basically follows the address management mechanism at the visited site network. Roughly speaking, there are a method for automatically acquiring this address by carrying out a procedure specified by the address management server at the mobile computer 2 and a method for manually setting an address allocated from the system manager into the mobile computer 2 by the user or the system manager.

For example, in the case of receiving the allocation of an address from the DHCP server at the visited site network, the mobile computer 2 transmits the initialization DHCPDISCOVER message and receives a DHCPOFFER message returned in response from the DHCP server, or transmits a DHCPREQUEST message in addition and receives a DHCPACK message returned in response from the DHCP server, so as to complete the DHCP address acquisition.

Note that in the case where it is detected that the mobile computer is located in the home network by the moving detection or in the case where the mobile computer is located outside the home network but there is no need for the Mobile IP communications, the usual IP communications will be carried out using the newly acquired address. Also, in the case where it is detected that the mobile computer is located in the home network by the moving detection, it is also possible to transmit a DHCPREQUEST message for the DHCP address allocated to the own device at that moment, and receive the new DHCP address allocation if a DHCPACK message is returned.

Note that various methods of the moving detection processing described above and the various methods of the address acquisition processing here can be realized in any suitable combination. Also, depending on the combination adopted, the moving detection and the address acquisition can be executed by nearly consecutive procedures (as in the case of detecting the moving by using DHCPDISCOVER and acquiring the address by using DHCPREQUEST which is to be done consecutively), or the address acquisition can be carried out before the moving detection is carried out (as in the case of setting the address by the manual operation and detecting the moving by comparing this address with the DHCP address or the network address of the home network stored in the own device). Also, in the case of adopting the Mobile IP mode that uses the foreign agent, both the moving detection and the address acquisition can be realized by simply receiving the advertisement from the foreign agent.

In the following, some concrete examples of the moving detection processing and the address acquisition processing will be described.

(1) First example of the moving detection processing and the address acquisition processing based on DHCP:

When the mobile computer 2 is re-activated at the visited site, the initialization DHCP request is transmitted and the DHCP address acquired by this is compared with the stored DHCP address described above, and (i) if the network addresses match, it is judged that the mobile computer 2 has not moved, or (ii) if the network addresses do not match, it is judged that the mobile computer 2 has moved.

In the case of the above described (i), the newly acquired DHCP address is not set to the TCP/IP of the mobile computer 2 and released immediately, and the address A that was allocated before the power is turned off will be leased to the communication module and used for the initialization (although in this case there is a need to check with the DHCP server if the address A is available). Else, the address A is discarded and the newly acquired DHCP address will be used as the home address.

In the case of the above described (ii), the newly acquired DHCP address is not set to the TCP/IP of the mobile computer 2 and released immediately, and the address A that was allocated before the power is turned off will be leased to the communication module and used for the initialization while an address to be used as the Care-of Address will be acquired afresh from the DHCP server. Else, the address A will be used as the home address similarly as before the power is turned off, and the newly acquired DHCP address will be used as the Care-of Address.

Figure 7:
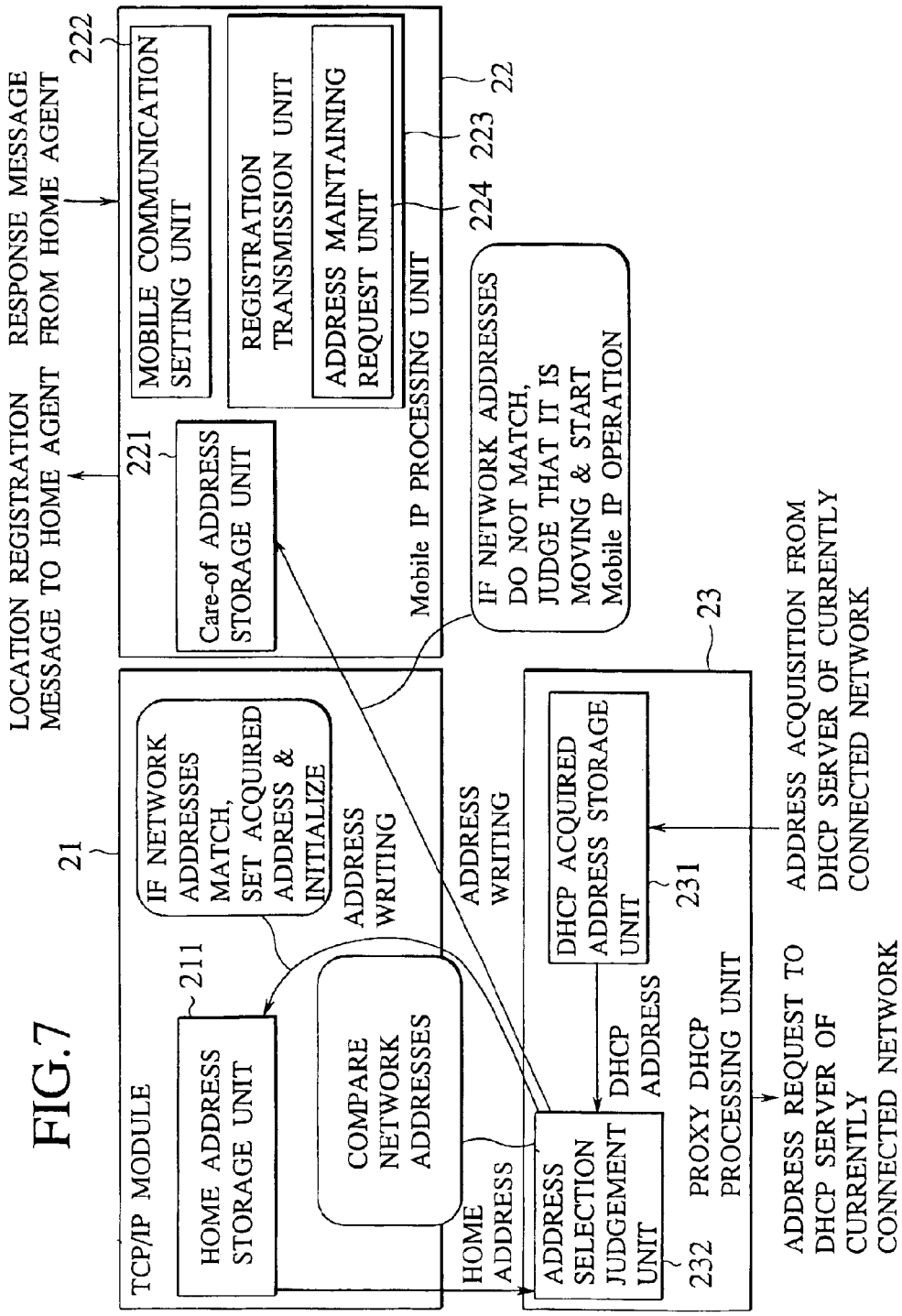
FIG. 7 is a block diagram showing another exemplary configuration of a mobile computer according to one embodiment of the present invention.

An exemplary configuration of a main portion of the mobile computer 2 which implements the above operation is shown in FIG. 7.

In the configuration of FIG. 7, a TCP/IP module 21 includes a Home Address storage unit 211, while a Mobile IP processing unit 22 includes a Care-of Address storage unit 221, a mobile communication setting unit 222, and a registration transmission unit 223 having an address maintaining request unit 224, and a proxy DHCP processing unit 23 includes a DHCP acquired address storage unit 231 and an address selection judgement unit 232.

In the example shown in FIG. 7, a proxy DHCP processing unit 23 transmits the address request message to the DHCP server after the moving, and acquires the address. The acquired address is stored in a DHCP address storage unit 231.

This DHCP address is compared with the home address stored in a home address storage unit 211 within a TCP/IP module 21, at an address selection judgement unit 232 provided in the proxy DHCP processing unit 23. If the network addresses match, the mobile computer 2 is located in the home network so that there is no need to use the Mobile IP, and it suffices to set the acquired address into the TCP/IP module 21 for example and carry out the same operation for initializing the computer as usual.

On the other hand, if the network addresses do not match, it is judged that the mobile computer 2 has moved from the home network. In this case, the acquired address is directly stored as a Care-of Address of the Mobile IP in a Care-of Address storage unit 221 for example, and the operation proceeds to the IP processing (generation and transmission of the registration message, etc.) by a Mobile IP processing unit 22 which will be described below.

Note that in the case where there is no address in the DHCP address storage unit 231 at a time of the initial DHCP address acquisition or the like, it is regarded that the own device is connected to the home network and a processing for initializing the communication module using the acquired address described above as the home address is carried out.

(2) Second example of the moving detection processing and the address acquisition processing based on DHCP:

When the mobile computer 2 is re-activated at the visited site, the initialization DHCPDISCOVER message is transmitted and the DHCP address offered by the DHCPOFFER message returned in response from the DHCP server is compared with the DHCP address or the network address of the home network stored in the own device, and the moving is judged similarly as described above.

When it is judged that the mobile computer 2 is located in the home network, the DHCPREQUEST message for the DHCP address that was allocated before the power is turned off or the DHCPREQUEST message for the offered DHCP address described above is transmitted to the DHCP server, and the home address acquisition is completed if the DHCPACK message is received in response.

On the other hand, when it is judged that the mobile computer 2 has moved to the other section network, the DHCPREQUEST message for the offered DHCP address described above is transmitted to the DHCP server, and the Care-of Address acquisition is completed if the DHCPACK message is received in response.

Now, the moving detection and the address acquisition in the case of adopting the Mobile IP mode using the foreign agent will be described.

In the case of adopting the Mobile IP mode using the foreign agent, the moving detection and the address acquisition at the visited site can be carried out by simply receiving the advertisement from the foreign agent (there can be a case where the foreign agent is the same server as the home agent).

In this case, when the mobile computer 2 is reactivated at the visited site, the mobile computer 2 is set in a state of waiting for (listening to) the advertisement from the foreign agent (or the server which functions as both the foreign agent and the home agent). Then, when the advertisement from the foreign agent is received, the foreign agent address or the allocated address contained therein is compared with the DHCP address or the network address of the home network stored in the own device, and the moving is judged similarly as described above.

When it is judged that the mobile computer 2 is located in the home network, the DHCPREQUEST message for the DHCP address that was allocated before the power is turned off is transmitted to the DHCP server, and the home address acquisition is completed if the DHCPACK message is received in response.

On the other hand, when it is judged that the mobile computer 2 has moved to the other section network, the allocated address contained in the above described advertisement from the foreign agent is used as the Care-of Address.

Here, it is also possible to enable the moving while keeping the mobile computer 2 in an operating state by using a radio network or the like. In such a case, there is no need to carry out the above described initialization operation, and when the mobile computer 2 moves from some network to another network, it is possible to acquire the Care-of Address from the visited site network and start the Mobile IP processing to be described below by using a network in which it is located before the moving or a specific network as the home network.

When the mobile computer 2 completes the operation up to the acquisition of the Care-of Address at the visited site network as described above, it becomes possible to carry out the registration processing for the Mobile IP communications.

In the following, the processing for the Mobile IP processing will be described.

Here, one exemplary operation sequence for the mobile computer 2 and the home agent 5 in the case where the mobile computer 2 is to be re-connected to the visited site network (which is assumed to be 1b) will be described.

First, the sequence for the case of the normal operation (the case where the DHCP address acquired by the mobile computer 2 before the moving becomes available at the visited site) will be described.

As described above, before the moving, the mobile computer 2 first transmits a prescribed message to the DHCP server 7 (see FIG. 8) or to the home agent 5 (see FIG. 9) such that the address A held in the own device will not be allocated to another computer.

The mobile computer 2 that has moved and re-connected to the network 1b is in a state where the communication module (the TCP/IP module in FIG. 6 and FIG. 7) has acquired the address A.

Figure 14:
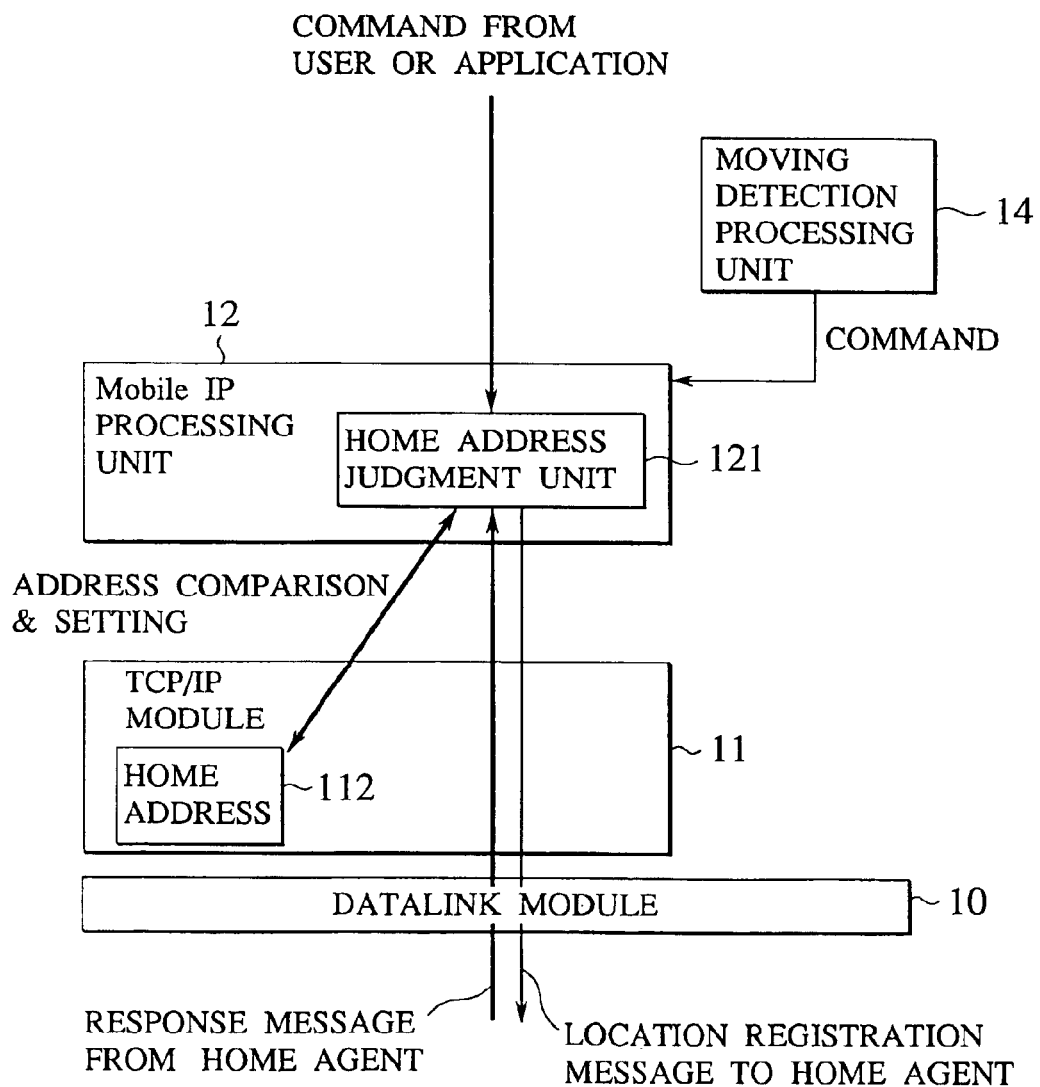
FIG. 14 is a a block diagram showing an exemplary configuration of a part of a mobile computer related to home address judgement processing according to one embodiment of the present invention.

When the mobile computer 2 is turned on at the visited site, the mobile computer 2 acquires the Care-of Address through the procedure as described above, and starts the Mobile IP processing using the address A as the home address (at a Mobile IP processing unit in FIG. 7 and FIG. 14).

Figure 10:
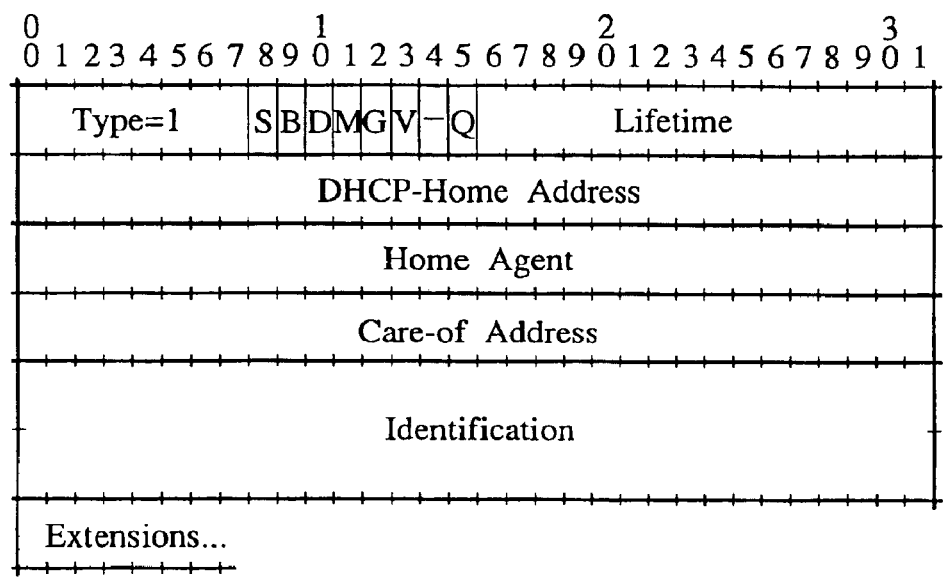
FIG. 10 is a diagram showing another exemplary format of a registration message according to one embodiment of the present invention.

First, the location registration message is transmitted to the home agent 5. This location registration message has an exemplary format as shown in FIG. 10, which is in an extended form of a message format shown in FIG. 2 as specified by RFC 2002.

Here, a Q-bit is a flag for indicating whether the acquired DHCP address is to be used at the home network or not (whether the own device has been receiving the dynamic address allocation at the home network or not), and DHCP-Home-Address indicates that acquired DHCP address. In this case, "on" is set to the Q-bit and the address A is set to the DHCP-Home-Address, for instance.

When the Q-bit is set to be "off", that is, when it is set in a state indicating that the own device has not been receiving the dynamic address allocation at the home network, the usual registration processing for the Mobile IP communications using the fixedly allocated home address will be carried out at both the mobile computer and the home agent.

On the other hand, when the Q-bit is set to be "on", that is, when it is set in a state indicating that the own device has been receiving the dynamic address allocation at the home network, the home agent 5 will carry out the usual registration processing for the Mobile IP communications, as well as a re-allocation processing for that dynamic address or a processing for dealing with the case where this dynamic address is already allocated to another computer and not available (at the Mobile IP processing unit 100 and the proxy DHCP processing unit 101 in FIG. 5).

Also, when the Q-bit is set to be "on", the initial location registration message for the Mobile IP registration and/or the subsequent location registration message for the re-registration to renew the lifetime will contain an information indicating that the home agent is requested to carry out the processing for preventing the allocation of the dynamic address to be used by the Mobile IP to another computer. In other words, the home agent 5 which received the location registration message with the Q-bit "on" will carry out the processing for continually reserving that dynamic address at least while it can be recognized that the Mobile IP communications for that mobile computer are carried out (at the Mobile IP processing unit 100 and the Proxy DHCP processing unit 101 in FIG. 5).

It is also possible to use such an initial location registration message with the Q-bit "on" as a message for requesting the reservation of the DHCP address that is to be transmitted by the mobile computer after the moving as already mentioned above.

Now, the home agent 5 which received this location registration message attaches the DHCP address described in the DHCP-Home-Address described above into the DHCPREQUEST message and transmits this message to the DHCP server 7 by broadcasting it over the home network 1a, on behalf of the mobile computer 2. Here, it is assumed that the DHCPACK message is returned from the DHCP server 7.

Thereafter, it is possible to carry out the Mobile IP using that DHCP address (i.e., the address A) as the home address. Namely, a prescribed authentication processing between the mobile computer 2 and the home agent 5 is carried out, and if the proper registration can be made, a response message indicating the registration success as shown in FIG. 3 is returned. Thereafter, the transfer of messages destined to the mobile computer 2 is carried out according to the sequence of the Mobile IP. Note that it is also possible to carry out the authentication processing first and then carry out the above described processing regarding the DHCP address when the authentication succeeds.

Also, thereafter, when a DHCPNAK message is transmitted from the DHCP server 7 as the valid period (lease time) of the DHCP address expires, the home agent 5 re-transmits the DHCPREQUEST message on behalf of the mobile computer 2 so as to continue reserving the DHCP address.

Also, the mobile computer 2 transmits the location registration message to the home agent 5 repeatedly at such timings that the valid period (lifetime) becomes over so as to make a re-registration. Namely, the home agent 5 continues to reserve the DHCP address as long as a message for the re-registration is received from the mobile computer 2 within the valid period (lifetime).

Note that the valid period of the DHCP address can be expected to be longer than the valid period of the registration of the mobile computer 2 normally, and in such a case, the home agent 5 may re-transmit the DHCPREQUEST message to the DHCP server 7 upon receiving the re-registration message from the mobile computer 2.

Also, when the registration message with the lifetime equal to 0 is received from the mobile computer 2 or the lifetime of the mobile computer 2 expires, the transmission of the DHCPREQUEST message to the DHCP server 7 may be cancelled, or the DHCPREQUEST message with the lease time set to be longer than usual to some extent may be transmitted only once.

Now, the above example is directed to a case of describing the dynamic address allocated to the mobile computer at the home network into the DHCP-Home-Address field of the location registration message, but it is also possible to adopt a configuration in which an information by which the home agent can identify the mobile computer, such as a mobile computer identifier that is uniquely assigned to each mobile computer, for example, is described instead of explicitly describing the dynamic address.

In the case of adopting such a configuration, the home agent 5 is assumed to manage a management table (102 of FIG. 5) containing the mobile computer identifier and the DHCP address as shown in FIG. 11. In FIG. 11, the information other than the mobile computer identifier and the DHCP address may be omitted if desired, or some other information may also be registered in the management table if desired.

In this case, the home agent 5 which received the location registration message can obtain the DHCP address used by the mobile computer 2 in the past, the identifier of the DHCP server, and the setting for the mobile computer 2 including the lease time, from the management table of FIG. 11 using the identifier of the mobile computer contained in the location registration message as a key. Note that, in this case, the home agent 5 can ascertain the DHCP server to which the DHCPREQUEST message should be transmitted according to the DHCP server identifier in the management table of FIG. 11, so that the exchange of the DHCPDISCOVER message and the DHCPOFFER message can be omitted.

Note also that, depending on whether the DHCP-Home-Address field of the location registration message describes the dynamic address, or the mobile computer identifier or the like, the following variations are conceivable.

(a) The dynamic address is described in every one of the initial location registration message and the subsequent location registration messages.

(b) The mobile computer identifier or the like is described in every one of the initial location registration message and the subsequent location registration messages.

(c) The mobile computer identifier or the like is described in the initial location registration message while the dynamic address is described in the subsequent location registration messages.

(d) The dynamic address and the mobile computer identifier or the like are used differently. In this case, the distinction as to whether it is the dynamic address or the mobile computer identifier or the like can be realized by either determining in advance respective ranges of values that can be taken by them mutually exclusively, or by providing a flag for identifying what is described in the DHCP-Home-Address field of the location registration message as the dynamic address or the mobile computer identifier or the like.

Also, as a variation to the procedure for reserving the dynamic address which is the home address of the mobile computer at a time of the Mobile IP communications, the following procedures that differ from the above described one is possible.

For example, the home agent 5 may be made to transmit the DHCPREQUEST message with the infinite lease time to the DHCP server 7 when the initial registration message or the next registration message for the re-registration is received.

Also, for example, the home agent 5 may be made to transmit the DHCPREQUEST message with the infinite lease time to the DHCP server 7 when the initial registration message or the next registration message for the re-registration is received, and to transmit the DHCPREQUEST message with the lease time set to be a usual value or a value longer than usual to some extent to the DHCP server 7 when the registration message with the lifetime equal to 0 is received from the mobile computer 2 or the lifetime of the mobile computer 2 expires.

Figure 12:
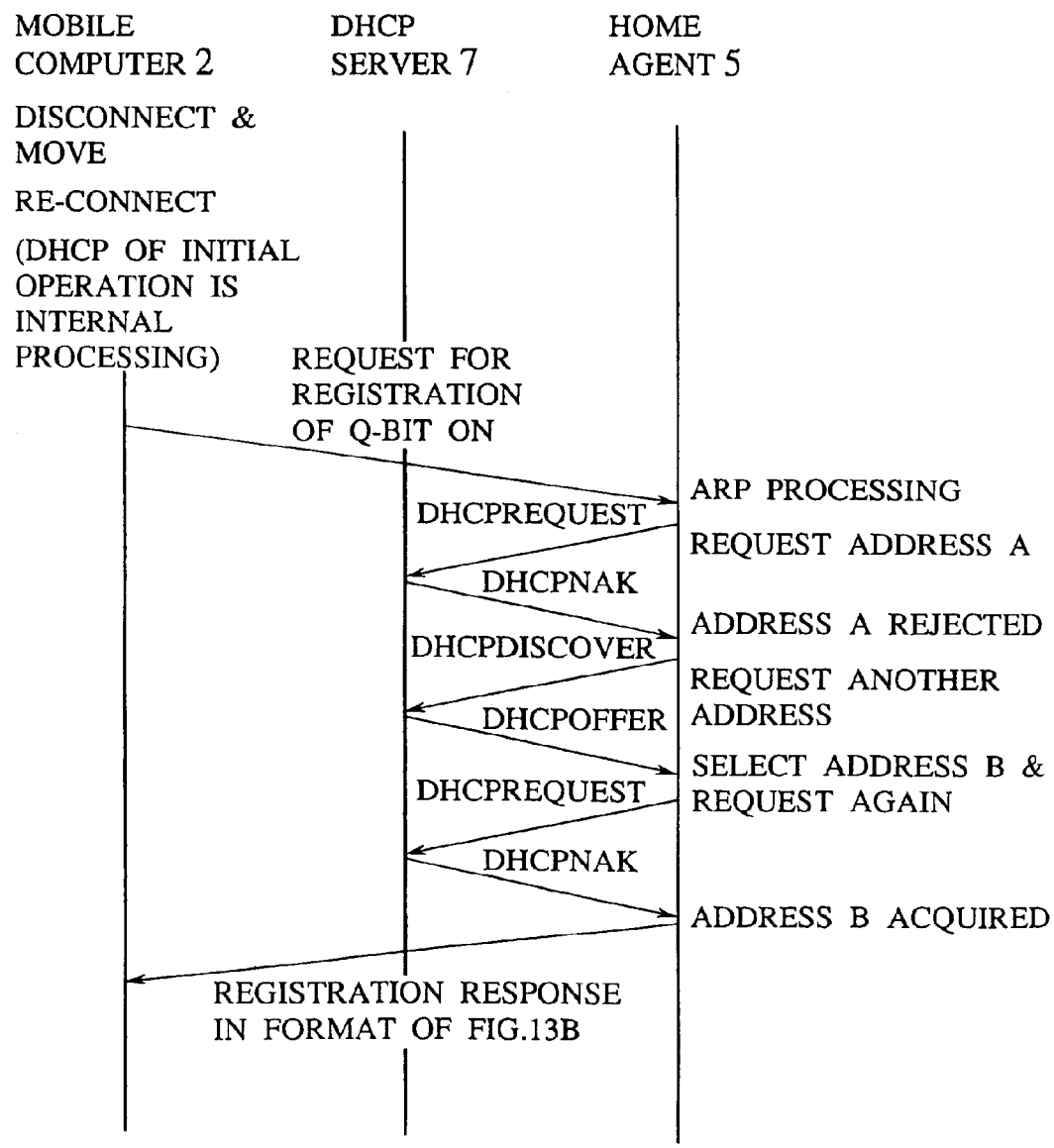
FIG. 12 is a sequence chart showing one exemplary system operation sequence at a time of address re-setting according to one embodiment of the present invention.

Next, with reference to FIG. 12, an exemplary sequence in the case where the re-setting at the new address is to be made (the case where the DHCP address acquired before the moving becomes unavailable) will be described.

Here, an exemplary case where the home agent makes a decision as to whether the Mobile IP communications are to be carried out or cancelled when the DHCP address acquired before the moving becomes unavailable will be described first.

First, as described above, the mobile computer 2 transmits a prescribed message to the DHCP server 7 or the home agent 5 before the moving such that the address A held by the own device will not be allocated to another computer.

The mobile computer 2 that has moved and re-connected to the visited site network is in a state where the communication module (the TCP/IP module 21 in FIG. 7) has acquired the address A.

When the mobile computer 2 is turned on at the visited site, the mobile computer 2 acquires the Care-of Address and starts the Mobile IP processing using the address A as the home address, through the procedure as described above.

First, similarly as in the exemplary sequence described above, the location registration message (with the Q-bit "on") indicating that the own device has been receiving the dynamic address allocation at the home network is transmitted to the home agent 5.

When this message is received, the home agent 5 attaches to the DHCPREQUEST message the DHCP address that is either described in the DHCP-Home-Address field described above or obtained by referring to the management table according to the mobile computer identifier or the like described in the DHCP-Home-Address field described above, and transmits this to the home network 1*a*, on behalf of the mobile computer 2.

Here, suppose that the DHCPNAK message indicating that the address A is unavailable (because it is already used by another computer during the moving of the mobile computer 2) is returned in response to the DHCPREQUEST message issued by the home agent 5 as a proxy.

In this case, the system (the mobile computer and/or the home agent, for example) can choose either:

(i) to cancel the Mobile IP communications, or (ii) to make a re-setting of another DHCP address as the home address and newly start the Mobile IP communications using that address.

Which one of (i) and (ii) described above is to be carried out when the dynamic address allocated to the mobile computer at the home network before the moving is unavailable, can be judged by the mobile computer 2 or set by the user in advance, and a desired control can be requested to the home agent 5 by setting a prescribed flag for commanding that in the registration message. Note that, as will be described in detail below, there are several variations in a method for judging which one of (i) and (ii) described above is to be carried out, such as a method in which the home agent does not make a judgement but acquires another DHCP address and offers it to the mobile computer and the mobile computer makes the judgement thereafter, and a method in which the home agent makes some judgement first and acquires another DHCP address and offers it to the mobile computer when it is judged as not the above described (i) and the mobile computer makes another judgement thereafter.

Figure 13A:
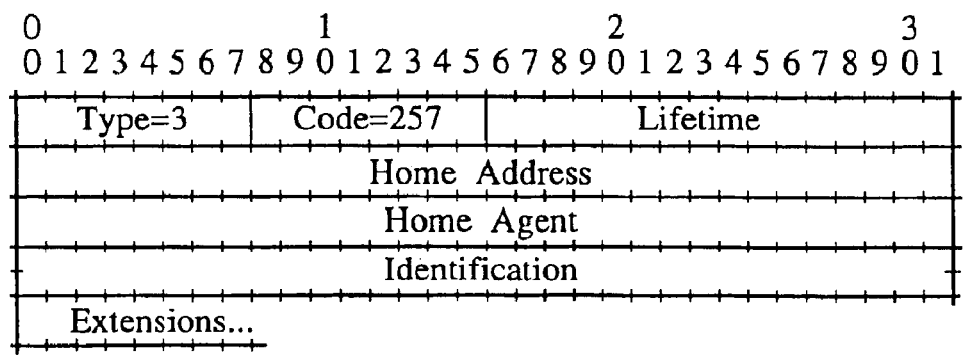
FIG. 13A and FIG. 13B are diagrams showing exemplary formats of a registration response message for a time of address acquisition failure according to one embodiment of the present invention.

Here, assuming that the judgement is to be made at the home agent 5 side (the judgement processing unit 103 of FIG. 5), in the case of the above described (i), a response message with a newly defined error code 257 attached thereto as shown in FIG. 13A is returned from the home agent 5 to the mobile computer 2 and the process is terminated.

Figure 13B:
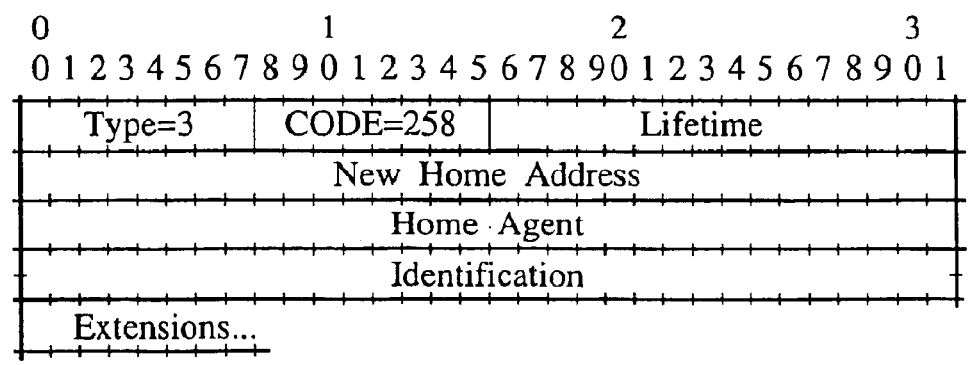

On the other hand, in the case of the above described (ii), the home agent 5 executes the DHCP request sequence for acquiring a new address so as to acquire a new address (which is assumed to be an address B). The DHCP request sequence is carried out, for example, by the procedure as shown in FIG. 12 which comprises the transmission of the DHCPDISCOVER message, the reception of the DHCPOFFER message, the transmission of the DHCPREQUEST message, and the reception of the DHCPACK message. Then, a response message with the new home address (the address B) and an error code 258 attached thereto as shown in FIG. 13B is returned to the mobile computer 2.

The mobile computer 2 which received this response message re-initializes the communication module using the new address B and starts the Mobile IP communications using this address B as the home address. Thereafter, the operation is similar to the above described case.

Note that it is also possible to enable the mobile computer 2 to request the home agent 5 or the DHCP server 7 of the home network 1*a* such that the leased address A will not be allocated to another computer by the DHCP server 7, even from its visited site network. For example, the mobile computer 2 transmits a prescribed message from the visited site to the home agent 5, and in response the home agent 5 transmits the DHCPREQUEST message with an appropriate lease time set therein to the DHCP server 7 on behalf of the mobile computer 2.

In this way, the mobile computer 2 can realize the further moving or the cancellation/resuming of the Mobile IP communications while maintaining the same home address.

In the following, the judgement as to whether the Mobile IP communications using the DHCP address (address B in this example) newly allocated from the DHCP server 7 of the home network are to be carried out or cancelled, when it is ascertained that the DHCP address (address A in this example) acquired from the DHCP server 7 of the home network by the mobile computer 2 before the moving is unavailable according to the proxy DHCP processing by the home agent 5 in the above described registration procedure for the Mobile IP communications, will be described. First, an exemplary case of making this judgement at the mobile computer 2 side will be described.

FIG. 14 shows an exemplary configuration of the mobile computer 2 which has such a judgement function.

Similarly as described above, the mobile computer 2 that has moved after transmitting a prescribed message for reserving the DHCP address as the home address and and activated at the visited site network detects the moving by comparing the home address (112 in FIG. 14) with the information on the network address obtained at the visited site network, for example, and acquires the Care-of Address and starts the Mobile IP processing using the address A as the home address.

When the mobile computer 2 transmits to the home agent 5 the location registration message (with the Q-bit "on") indicating that the own device has been receiving the dynamic address allocation at the home network, the home agent 5 which received this message transmits the DHCPREQUEST message with the address A attached thereto.

When the DHCPACK message is returned in response to this DHCPREQUEST message, the home agent 5 returns a response message for the registration success as shown in FIG. 3, whereas when the DHCPNAK message is returned in response, the home agent 5 executes the DHCP request sequence for acquiring the new address without making the above described judgement, and acquires the new address (address B). Then, the home agent 5 returns to the mobile computer 2 the response message with the new home address (address B) and the error code 258 attached there to as shown in FIG. 13B.

The mobile computer 2 which received this response message makes a judgement as to whether the home address information contained in the response message received from the home agent 5 is an address expected by the own device or not, at a home address judgement unit 121 in the Mobile IP processing unit 12. This judgement is made in the following two steps.

(I) Whether it is an expected address (the same address as the home address stored in the TCP/IP module) or not is checked. If it is the expected address, it implies that the Mobile IP registration has succeeded.

(II) If is not the expected address, whether that is acceptable or not (whether it is allowed to have the home address of the Mobile IP changed or not) is judged. This judgement is made according to a command from the user or the application.

When it is judged as the unexpected address and not acceptable, it is decided that the Mobile IP communications are to be cancelled. When it is judged as the unexpected address but acceptable, it is decided that the Mobile IP communications are to be carried out using another DHCP address B.

In the following, an exemplary procedure for making the judgement of the above described (II) will be described in detail. The judgement of the above described (II) depends on a form of the application executed at the mobile computer and a form of using the mobile computer.

In view of the influence due to the change of the home address, the following two cases are there.

(i) A case where it is problematic if the home address is changed.

(ii) A case where it is not problematic even if the home address is changed.

The case (i) includes a case where the service provided by a third party computer transmits packets to a fixed address regardless of the home address change and a case where the mobile computer utilizes a service which only receives packets transmitted from that address. More specifically, this corresponds to the case of a chat program, a push button type information delivery service, and an access restriction for the sake of security. Also, the home address should not be changed in the case of the moving during the communication connection because the communication becomes impossible when the home address is changed. The case (ii) includes a case of utilizing a service provided at the home network which is limited only to accesses from the home network. More specifically, this corresponds to the case of a service that handles basically secret information.

Figure 16:
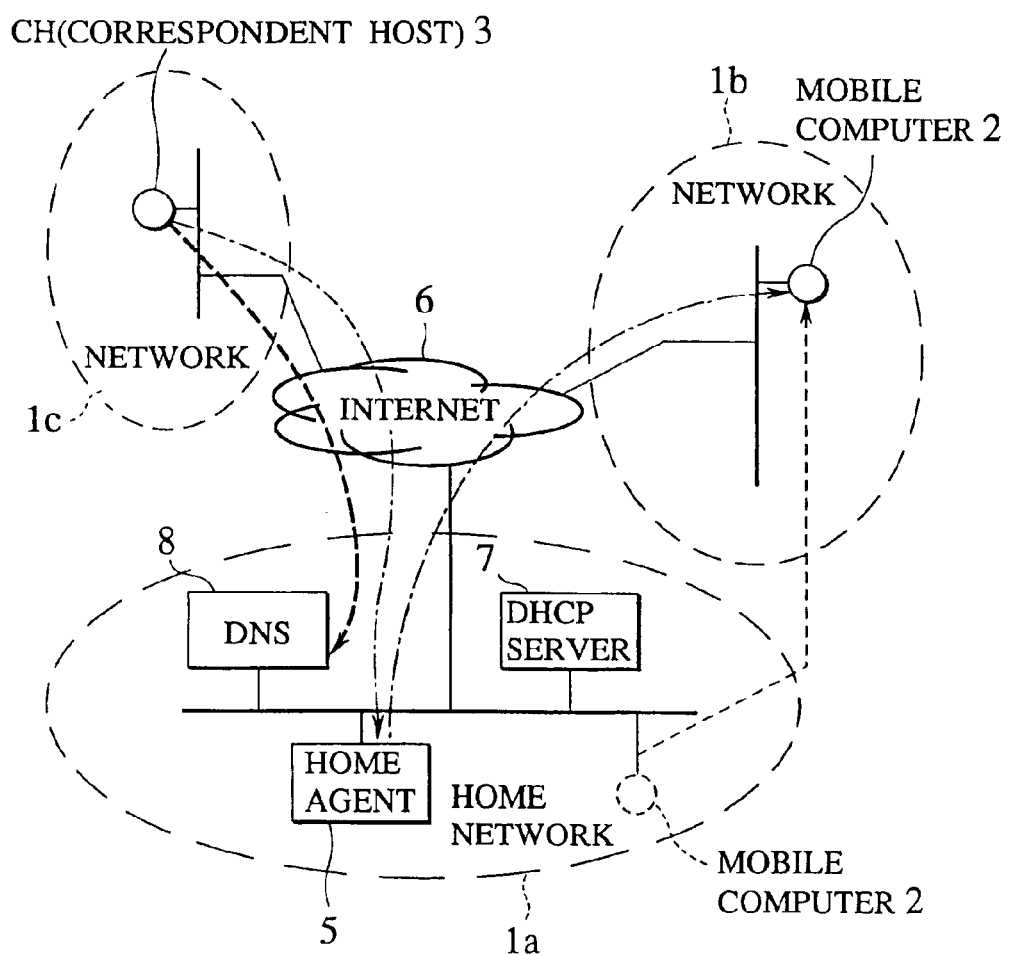
FIG. 16 is a schematic diagram showing another exemplary configuration of a communication system according to one embodiment of the present invention.

Note however that a chat program and a push button type information delivery service that are classified in the case (ii) can also deal with the home address change provided that the use of a scheme for retrieving an address from a name of the mobile computer at a time of transmitting packets destined to the mobile computer from the third party computer is presupposed (see FIG. 16). This is generally well known as a method for carrying out the address resolution using DNS (Domain Name Server). In the case where the home address of the mobile computer is changed, the registered information of the mobile computer in a name-address correspondence management server for managing correspondences between names and addresses of computers belonging to the home network can be changed to the address B which is the home address after the change. In this way, the computer which transmits packets destined to the mobile computer can transmit packets to the address B rather than the address A used before the change, so that the problem can be resolved. Note that the functions of this name management server will be described later on.

It can be seen from the above that a usage of the mobile computer corresponding to the following conditions cannot deal with the change of the home address.

(a) A service which waits and receives communications from a third party computer is utilized (provided that the third party computer does not carry out the address resolution based on names or the name-address correspondence management server managing the mobile computer does not handle the home address change).

(b) Packets to be transmitted by the mobile computer are required to have a fixed home address as their source.

(c) The mobile computer moves during the communication connection.

The mobile computer 2 maintains an information regarding a property of a usage of the own device, judges whether the property of the usage of the own device corresponds to the above conditions (a) to (c) by referring to this maintained information when the DHCP address allocated to the mobile computer 2 is changed to an address other than the address A, and determines whether or not to carry out the Mobile IP communications according to this judgement result.

Figure 15:
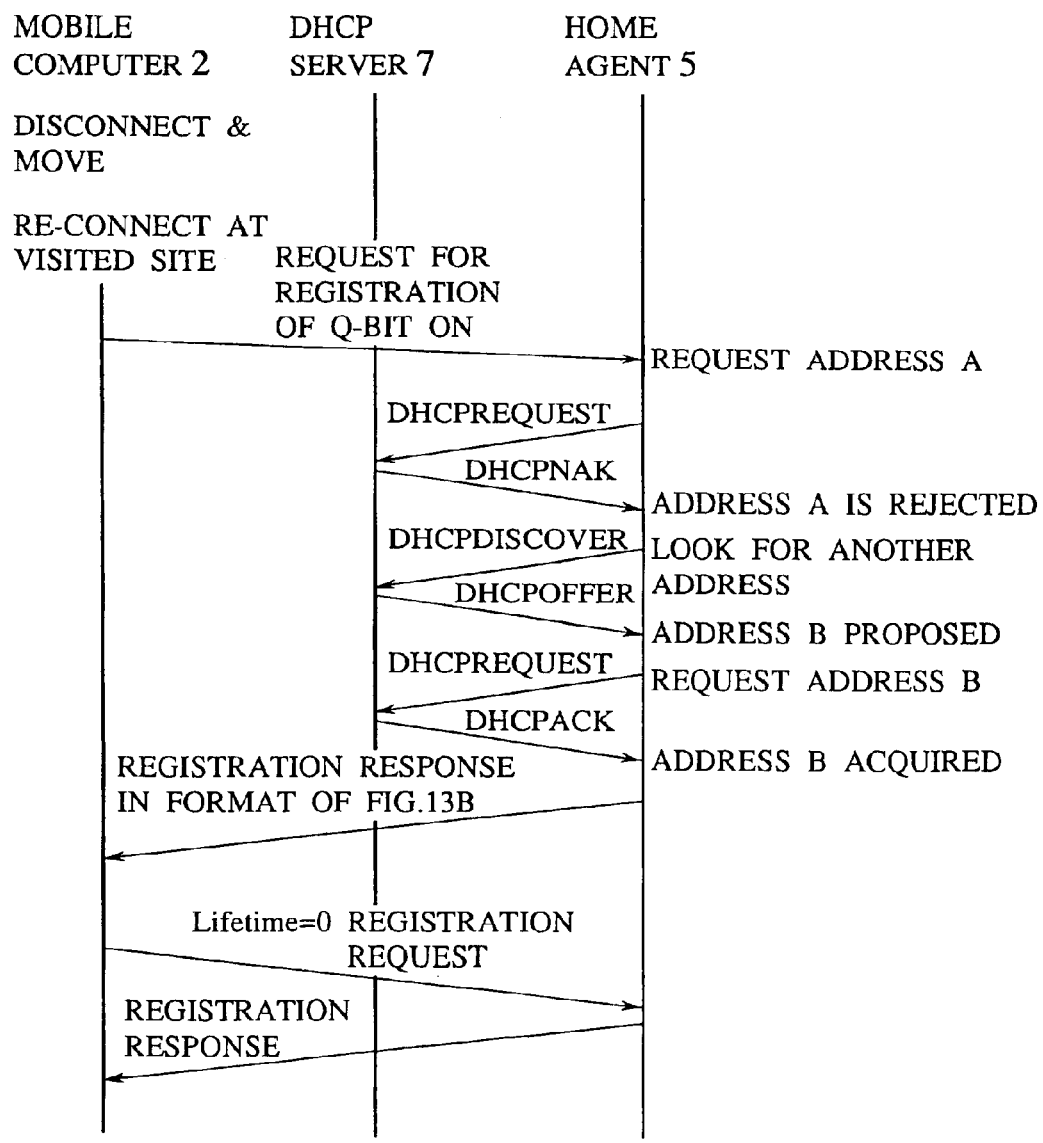
FIG. 15 is a sequence chart showing another exemplary system operation sequence according to one embodiment of the present invention.

Now, the mobile computer 2 which received the response message containing the new address B from the home agent 5 makes a judgement as to whether it is operable using the new address B, that is, whether the Mobile IP communications are to be carried out by initializing the communication module using the address B or not, by comparing the setting made in advance or the information regarding the usage of the own device that is obtained from the currently activated service with the above conditions (a) to (c). The sequence in the case where the mobile computer 2 makes the re-setting using the address B is as shown in FIG. 12. On the other hand, in the case of cancelling the Mobile IP communications, the mobile computer 2 transmits a location registration message with the lifetime equal to 0 to the home agent 5, as shown in FIG. 15, for example.

Note that the above judgement is made by the mobile computer 2 at a time of receiving the response message from the home agent 5 in the above, but it is also possible to make the above judgement in advance at the mobile computer 2 on an assumption of an occurrence of the address change, and transmit a registration message with a command information indicating the judgement result attached thereto, such that the home agent 5 which received this registration message makes the above judgement according to that command information (and the mobile computer side does not make the judgement).

For example, when the location registration message (with the Q-bit "on") indicating that the own device has been receiving the dynamic address allocation at the home network which also contains the above described command information is received from the mobile computer 2, the home agent 5 transmits the DHCPREQUEST message with the address A attached thereto.

When the DHCPACK message is returned in response to this DHCPREQUEST message, the home agent 5 returns a response message for the registration success as shown in FIG. 3, but when the DHCPNAK message is returned in response, if the above described command information indicates that "Mobile IP communications using another DHCP address are to be carried out if the expected DHCP address is unavailable", the home agent 5 executes the DHCP request sequence for acquiring the new address so as to acquire the new address (address B). Then, the response message for the registration success as shown in FIG. 3 (or the response message with the new home address (address B) and the error code 258 attached thereto as shown in FIG. 13B) is returned to the mobile computer 2. If the command information indicates that "Mobile IP communications cannot be carried out by another DHCP address", the DHCP request sequence will not not executed and a response message for the registration failure will be returned.

Or, it is also possible to maintain a correspondence between a DHCP address that is expected to be available as the home address by each mobile computer and a property of a usage of that mobile computer in the home agent 5, and makes the judgement similar to the above described according to this information (and the mobile computer side does not make the judgement).

For example, when the location registration message (with the Q-bit "on") indicating that the own device has been receiving the dynamic address allocation at the home network is received from the mobile computer 2, the home agent 5 transmits the DHCPREQUEST message with the address A attached thereto.

When the DHCPACK message is returned in response to this DHCPREQUEST message, the home agent 5 returns a response message for the registration success as shown in FIG. 3, but when the DHCPNAK message is returned in response, if it is judged that "Mobile IP communications using another DHCP address are to be carried out if the expected DHCP address is unavailable" according to the information as described above which is stored in correspondence to that mobile computer 2, the home agent 5 executes the DHCP request sequence for acquiring the new address so as to acquire the new address (address B). Then, the response message for the registration success as shown in FIG. 3 (or the response message with the new home address (address B) and the error code 258 attached thereto as shown in FIG. 13B) is returned to the mobile computer 2.

Alternatively, it is also possible to make that judgement at both the home agent 5 and the mobile computer 2 by combining a configuration in which the home agent 5 makes the judgement according to the above described information stored in correspondence to the mobile computer 2 and a configuration in which the mobile computer 2 makes the judgement upon receiving the response message as described above.

Also, in the case where the judgement as to "whether or not the Mobile IP communications using another DHCP address are to be carried out if the expected DHCP address is unavailable" is to be made at both the home agent 5 and the mobile computer 2, the home agent 5 may make the judgement according to criteria different from the mobile computer 2.

Note that, in the above described judgement, the judgement result in the case of utilizing a service which waits and receives communication from the third party computer becomes different depending on whether or not to use the scheme for retrieving an address from a name of the mobile computer at a time of transmitting packets destined to the mobile computer from the third party computer by utilizing the function of the name management server as shown in FIG. 16.

Namely, in the case of carrying out the conversion from a host name to an address by utilizing the name management server (DNS 8 in FIG. 16) at a time of transmitting packets destined to the mobile computer 2 on the network 1a from the correspondent host 3 (in which a procedure to establish a session after converting an identifier of the mobile computer 2 into the home address is adopted in the case of establishing a session with respect to the mobile computer 2), it is possible to carry out the Mobile IP communications using another DHCP address by the mobile computer 2 at the network 1b even when a service that waits and receives communications from the third party computer is to be utilized.

Now, the functions of the name management server will be described. The required functions of the name management server include a function for returning an address in response to an inquiry using a name as a key, a function for returning a name in response to an inquiry using an address as a key, and a function for changing information on the name and the address. In the case of using DNS as the name-address correspondence management server, these functions can be realized by extending a function to change the name and address information in response to a request from the home agent. Also, if the third party computer is adapted to use a directory server as the address resolution means, it is also possible to use the name-address correspondence management server.

Also, in the case where the name management server as described above is to be provided at the home network, when the dynamic address allocated to the mobile computer 2 at the home network is changed, the home agent 5 either transmits or makes an address management server to transmit a home address change request message for notifying a correspondence between the name of the mobile computer 2 and the new address to the name management server that manages a correspondence between the name and the address of the mobile computer 2 (at the address change processing unit 104 in FIG. 5).

A variety of schemes for the case of carrying out the Mobile IP communications at the mobile computer that operates by receiving the dynamic address allocation at the home network are described above.

Now, when the mobile computer carries out the Mobile IP communications at the visited site network, there can be cases where it is desirable to also use the usual IP communications (such as those utilizing resources and services at the visited site network by directly utilizing the visited site network, for example) rather than the Mobile IP communications. In the following, the mobile computer which has an additional function for enabling such an operation will be described.

Note that the Mobile IP function is not absolutely necessary if it is only for the purpose of enabling the mobile computer to carry out communications from the visited site network. The cases where the Mobile IP function is necessary are the following.

(a) A case where the mobile computer moves during the communication connection.

(b) A case where the mobile computer receives packets transmitted to the home address.

(c) A case where the mobile computer utilizes a service which can be accessed only from the home address because of the restriction for the sake of security or the like.

The Mobile IP is not absolutely necessary in the cases which do not meet these conditions.

On the contrary, it is not appropriate to use the Mobile IP in the case of utilizing a service which can be accessed only from the visited site network. More specifically, it is suitable to judge that the Mobile IP function should not be used in the cases such as the following, for example.

(a) A case where the connectivity is lost when the mobile computer moves and the address is changed as in the case of connection-oriented communications such as those of transaction or TCP connection.

(b) A case where a fixed address is used as a home address of the mobile computer as in a chat type application or a push button type service delivery.

(c) A case of utilizing a service for which accesses are restricted only from within the home network.

On the other hand, the cases where the Mobile IP function is unnecessary are the cases where communications using the home address is unnecessary, and the moving registration is unnecessary in the case of voluntary communication not related to the security at the visited site (such as the case of viewing World Wide Web pages using a browser). In addition, in the case of utilizing a device (a printer, for example) provided at the visited site network, there can be a case where the operation request from the home address of the mobile computer will not be accepted depending on the setting of the visited site network. In this case, if the network ID of the packet and the network ID of the Care-of Address allocated to the mobile computer are identical, the above device becomes utilizable by using the Care-of Address as the source address of packets transmitted from the mobile computer. Also, packets destined to the mobile computer will be transmitted directly to the mobile computer so that the communication overhead can be small.

The judgement as to whether or not to use the Mobile IP is made according to:

(i) a type of the application software to be used; and (ii) an address of a computer which is to be a correspondent of the application software.

For the above described (i), the use of the Mobile IP is judged dynamically according to the type of the application, and source addresses of transmission packets are determined. For the above described (ii), the use of the Mobile IP is judged dynamically according to destination addresses of packets to be transmitted by the mobile computer, and source addresses of transmission packets are determined. The information on both the above described (i) and (ii) can be either set up in advance or specified by the user when the need arises.

FIG. 17 shows an exemplary configuration of a main portion of such a mobile computer 2.

When the mobile computer 2 receives a packet (destined to the Care-of Address) from the home agent 5 or a correspondent host which does not use the Mobile IP, whether it is a packet from the home agent 5 or not is checked at a Mobile IP utilization judgement unit (for reception) 16.

In the case of a packet transmitted by the home agent 5, the Mobile IP processing becomes necessary, so that a packet destined to the home address is taken out through a Mobile IP processing unit 12 and transferred to the application. In the case of a packet transmitted by a host other than the home agent 5, it is a packet from a correspondent host with which the mobile computer 2 is communicating without using the Mobile IP so that it is directly transferred to the application.

In the case where the mobile computer 2 transmits a packet using the Mobile IP, the application outputs data to a Mobile IP utilization judgement unit (for transmission) 15, and this mobile IP utilization judgement unit 15 transmits it as a packet with the home address as the source address for communications using the Mobile IP or as a packet with the Care-of Address as the source address for communications not using the Mobile IP, according to a command from the user or the application.

Note that the configuration for using the Mobile IP and the usual IP separately as described above can be realized independently from the other features of the present invention, and is applicable to a mobile computer which has a dynamically allocated home address but does not have functions of the present embodiment as described above, or to a mobile computer which has a fixedly allocated home address.

As described above, in the conventional Mobile IP scheme, it is necessary for the mobile host to have the home address fixedly allocated at the home network, and in the case where the mobile host belongs to the home network which makes the dynamic IP address allocation according to the DHCP that has become popular rapidly in recent years, it is necessary to provide a procedure for maintaining special IP addresses for mobile hosts, and this has been a major obstruction to the smooth introduction of the Mobile IP scheme.

In this regard, according to this embodiment, the mobile computer transmits a prescribed message to request maintaining the dynamic address (DHCP address) used up until then to the address management server (DHCP server) for managing dynamic addresses or the mobile computer management device (home agent) at a time of leaving the home network, and when the mobile computer is re-connected to the visited site network, the mobile computer transmits a current location registration message containing a flag information for indicating the use of the dynamic address (DHCP address) used up until then and the maintained dynamic address (DHCP address) or an information from which the maintained dynamic address can be obtained to the mobile computer management device (home agent), and the mobile computer management device (home agent) which received this message transmits a message (DHCP request message) for continually using that dynamic address (DHCP address) to the address management server (DHCP server) on behalf of the mobile computer thereafter, so that the mobile computer can carry out operations using the mobile communication protocol (Mobile IP) easily even in the case where the home network is operated by the dynamic address allocation protocol (DHCP), for example.

Namely, according to the present invention, the current location registration message to be transmitted by the mobile computer from the visited site to the mobile computer management device contains an information indicating that the dynamic address allocation has been received at the home network and an information capable of identifying the own device (which can be the allocated dynamic address), and the mobile computer management device carries out exchanges with the dynamic address management server on behalf of the mobile computer, so that the mobile computer which has received the dynamic address allocation at the home network can be operated at the visited site by using the mobile communication protocol.

It is to be noted that this embodiment has been described for a communication system in the Co-located Care-of Address mode, but the present invention is equally applicable to a mobile communication system that assumes the existence of the foreign agent as well.

The present invention is also applicable to the case where the home network and/or the visited site network of the mobile computer are operated by arbitrary address allocation scheme other than the DHCP or by a plurality of address allocation schemes that are mixedly used, or else by the DHCP and one or a plurality of address allocation schemes other than the DHCP that are mixedly used.

The present invention is also applicable not only to the Mobile IP specified by RFC 2002 but also to any of various other mobile communication protocols that are currently proposed.

It also is to be noted that the above described embodiment according to the present invention may be conveniently implemented in forms of software programs for realizing the operations of the mobile computer and the home agent, as will be apparent to those skilled in the computer art. Appropriate software coding can readily be prepared by skilled programmers based on the teachings,of the present disclosure, as will be apparent to those skilled in the software art.

In particular, each one of the entire mobile computer and the entire home agent as described above can be conveniently implemented in a form of a software package. Such a software program can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile computer device capable of carrying out communications while moving among inter-connected networks which includes a mobile computer management device provided at a home network of the mobile computer device for transferring packets destined to the mobile computer device to a current location of the mobile computer device, the mobile computer device comprising:

a transmission unit configured to transmit a message for requesting not to allocate a dynamic address allocated to the mobile computer device at the home network to another computer for a prescribed period of time, to one of an address management server of the home network and the mobile computer management device; and a mobile communication unit configred to exchange messages with the mobile computer management device and carry out mobile communications using the dynamic address allocated to the mobile computer device at the home network, after the mobile computer device moved outside the home network, wherein said request message sent by the mobile computer device has a lease time set to be a time amount x and is periodically at a periodic time amount y, and wherein y is greater than or equal to x.

2. The mobile computer device of claim 1, further comprising:

a dynamic host configuration protocol (DHCP) server, wherein the mobile computer device transmits the request message to the mobile computer management device for requesting not to allocate a dynamic address allocated to the mobile computer device.

3. The mobile computer device of claim 2, wherein the mobile computer management device periodically sends the request message to the DHCP server at the periodic time amount y until a local registration message for mobile communications is received from the mobile computer device.

4. A mobile computer management method for a communication system having a mobile computer which is capable of carrying out communications while moving among networks, and a mobile computer management device provided at a home network of the mobile computer for transferring packets destined to the mobile computer to a current location of the mobile computer, the mobile computer management method comprising:

transmitting from the mobile computer a message for requesting not to allocate a dynamic address allocated to the mobile computer at the home network to another computer for a prescribed period of time, to one of an address management server of the home network and the mobile computer management device; and exchanging messages with the mobile computer management device and carrying out mobile communications using the dynamic address allocate to the mobile computer at the home network, at the mobile computer after the mobile computer moved outside the home network, wherein said request message sent by the mobile computer device has a lease time set to be a time amount x and is periodically sent at a periodic time amount y, and wherein y is greater than or equal to x.

5. The mobile computer management method of claim 4, further comprising:

transmiting the request message to the mobile computer management device for requesting not to allocate a dynamic address allocated to the mobile computer device.

6. The mobile computer management method of claim 5, wherein the mobile computer management device periodically sends the request message to the DHCP server at the periodic time amount y until a local registration message for mobile communications is received from the mobile computer device.

7. A computer program product for causing a computer to function as a mobile computer device capable of carrying out communications while moving among inter-connected networks which includes a mobile computer management device provided at a home network of the mobile computer device for transferring packets destined to the mobile computer device to a current location of the mobile computer device, the computer program product comprising:

a first computer program code for causing the computer to transmit a message for requesting not to allocate a dynamic address allocated to the mobile computer device at the home network to another computer for a prescribed period of time, to one of an address management server of the home network and the mobile computer management device; and a second computer program code for causing the computer to exchange messages with the mobile computer management device and carry out mobile communications using the dynamic address allocated to the mobile computer device at the home network, after the mobile computer device moved outside the home network, wherein said request message sent by the mobile computer device has a lease time set to be a time amount x and is periodically sent at a periodic time amount y, and wherein y is greater than or equal to x.

8. The computer program product of claim 7, further comprising:

third computer program code for causing the mobile computer device to transmit the request message to the mobile computer management device for requesting not to allocate a dynamic address allocated to the mobile computer device.

9. The computer program product of claim 8, wherein the mobile computer management device periodically sends the request message to the DHCP server at the periodic time amount y until a local registration message for mobile communications is received from the mobile computer device.

* * * * *